(12) United States Patent (10) Patent No.: US 7,971,055 B2
Weeks et al. (45) Date of Patent: *Jun. 28, 2011

(54) TRUST MANAGEMENT SYSTEMS AND METHODS

(75) Inventors: Stephen P. Weeks, Sunnyvale, CA (US); Xavier Serret-Avila, Santa Clara, CA (US)

(73) Assignee: Intertrust Technologies Corp., Sunnyvale, CA (US)

( * ) Notice: Subject to any disclaimer, the term of this patent is extended or adjusted under 35 U.S.C. 154(b) by 53 days.

This patent is subject to a terminal disclaimer.

(21) Appl. No.: 12/147,264

(22) Filed: Jun. 26, 2008

(65) Prior Publication Data

US 2009/0031126 A1 Jan. 29, 2009

Related U.S. Application Data

(63) Continuation of application No. 11/614,860, filed on Dec. 21, 2006, now Pat. No. 7,395,550, which is a continuation of application No. 09/863,199, filed on May 21, 2001, now Pat. No. 7,313,692.

(60) Provisional application No. 60/205,402, filed on May 19, 2000.

(51) Int. Cl.
*H04L 9/00* (2006.01)

(52) U.S. Cl. .............................. 713/156; 713/157; 726/2

(58) Field of Classification Search .................... 726/10, 726/2; 713/156–157, 175, 182
See application file for complete search history.

(56) References Cited

U.S. PATENT DOCUMENTS

| 4,827,508 | A | 5/1989 | Shear |
| 4,977,594 | A | 12/1990 | Shear |
| 5,050,213 | A | 9/1991 | Shear |
| 5,410,598 | A | 4/1995 | Shear |
| 5,530,235 | A | 6/1996 | Stefik et al. |
| 5,534,975 | A | 7/1996 | Stefik et al. |
| 5,629,980 | A | 5/1997 | Stefik et al. |
| 5,634,012 | A | 5/1997 | Stefik et al. |
| 5,638,443 | A | 6/1997 | Stefik et al. |

(Continued)

FOREIGN PATENT DOCUMENTS

EP 0 715 247 A1 6/1996

(Continued)

OTHER PUBLICATIONS

Menezes, A. J. et al., Handbook of Applied Cryptography, CRC Press, Oct. 1996. ISBN 0-8493-8523-7 (hardcover).

(Continued)

*Primary Examiner* — Thanhnga B Truong
(74) *Attorney, Agent, or Firm* — Finnegan, Henderson Farabow, Garrett & Dunner LLP

(57) ABSTRACT

The present invention provides systems and methods for making efficient trust management decisions. A trust management engine is provided that processes requests for system resources, authorizations or certificates, and the identity of one or more root authorities that are ultimately responsible for granting or denying the requests. To determine whether a request should be granted, the trust management engine identifies a set principals from whom authorization may flow, and interprets each of the certificates as a function of the state of one or more of the principals. The processing logic iteratively evaluates the functions represented by the certificates, updates the states of the principals, and repeats this process until a reliable determination can be made as to whether the request should be granted or denied. The certificates may be evaluated until the state of the root authority indicates that the request should be granted, or until further evaluation of the certificates is ineffective in changing the state of the principals.

8 Claims, 22 Drawing Sheets

U.S. PATENT DOCUMENTS

| | | | |
|---|---|---|---|
| 5,715,403 | A | 2/1998 | Stefik |
| 5,892,900 | A | 4/1999 | Ginter et al. |
| 5,910,987 | A | 6/1999 | Ginter et al. |
| 5,915,019 | A | 6/1999 | Ginter et al. |
| 5,917,912 | A | 6/1999 | Ginter et al. |
| 5,920,861 | A | 7/1999 | Hall et al. |
| 5,940,504 | A | 8/1999 | Griswold |
| 5,943,422 | A | 8/1999 | Van Wie et al. |
| 5,949,876 | A | 9/1999 | Ginter et al. |
| 5,958,050 | A | 9/1999 | Griffin et al. |
| 5,982,891 | A | 11/1999 | Ginter et al. |
| 5,999,949 | A | 12/1999 | Crandall |
| 6,006,332 | A | 12/1999 | Rabne et al. |
| 6,112,181 | A | 8/2000 | Shear et al. |
| 6,138,119 | A | 10/2000 | Hall et al. |
| 6,157,721 | A | 12/2000 | Shear et al. |
| 6,185,683 | B1 | 2/2001 | Ginter et al. |
| 6,237,786 | B1 | 5/2001 | Ginter et al. |
| 6,240,185 | B1 | 5/2001 | Van Wie et al. |
| 6,253,193 | B1 | 6/2001 | Ginter et al. |
| 6,292,569 | B1 | 9/2001 | Shear et al. |
| 6,363,488 | B1 | 3/2002 | Ginter et al. |
| 6,389,402 | B1 | 5/2002 | Ginter et al. |
| 6,427,140 | B1 | 7/2002 | Ginter et al. |
| 6,449,367 | B2 | 9/2002 | Van Wie et al. |
| 6,591,231 | B1 | 7/2003 | Kurshan et al. |
| 6,618,484 | B1 | 9/2003 | Van Wie et al. |
| 6,640,304 | B2 | 10/2003 | Ginter et al. |
| 6,658,568 | B1 | 12/2003 | Ginter et al. |
| 6,668,325 | B1 | 12/2003 | Collberg et al. |
| 6,754,829 | B1 | 6/2004 | Butt et al. |
| 6,785,815 | B1 | 8/2004 | Serret-Avila et al. |
| 6,832,316 | B1 | 12/2004 | Sibert |
| 2001/0042043 | A1 | 11/2001 | Shear et al. |
| 2002/0023214 | A1 | 2/2002 | Shear et al. |
| 2002/0048369 | A1 | 4/2002 | Ginter et al. |
| 2002/0112171 | A1 | 8/2002 | Ginter et al. |
| 2002/0152173 | A1 | 10/2002 | Rudd |
| 2003/0023856 | A1 | 1/2003 | Horne et al. |
| 2003/0041239 | A1 | 2/2003 | Shear et al. |
| 2003/0046244 | A1 | 3/2003 | Shear et al. |
| 2003/0069748 | A1 | 4/2003 | Shear et al. |
| 2003/0069749 | A1 | 4/2003 | Shear et al. |
| 2003/0084003 | A1 | 5/2003 | Pinkas et al. |
| 2003/0105721 | A1 | 6/2003 | Ginter et al. |
| 2003/0163431 | A1 | 8/2003 | Ginter et al. |
| 2004/0054630 | A1 | 3/2004 | Ginter et al. |
| 2004/0059951 | A1 | 3/2004 | Pinkas et al. |
| 2004/0073813 | A1 | 4/2004 | Pinkas et al. |
| 2004/0103305 | A1 | 5/2004 | Ginter et al. |
| 2004/0107356 | A1 | 6/2004 | Shamoon et al. |
| 2004/0123129 | A1 | 6/2004 | Ginter et al. |
| 2004/0133793 | A1 | 7/2004 | Ginter et al. |
| 2005/0027871 | A1 | 2/2005 | Bradley et al. |
| 2005/0050332 | A1 | 3/2005 | Serret-Avila et al. |
| 2005/0060560 | A1 | 3/2005 | Sibert |
| 2005/0060584 | A1 | 3/2005 | Ginter et al. |
| 2005/0108555 | A1 | 5/2005 | Sibert |

FOREIGN PATENT DOCUMENTS

| | | |
|---|---|---|
| WO | WO 98/09209 | 3/1995 |
| WO | WO 96/27155 | 9/1996 |
| WO | WO 97/43761 | 11/1997 |
| WO | WO 98/10381 | 3/1998 |
| WO | WO 98/37481 | 8/1998 |
| WO | WO 99/01815 | 1/1999 |
| WO | WO 99/24928 | 5/1999 |
| WO | WO 99/48296 | 9/1999 |
| WO | WO 00/75925 | 12/2000 |
| WO | WO 01/06374 | 1/2001 |
| WO | WO 01/09702 | 2/2001 |
| WO | WO 01/10076 | 2/2001 |

OTHER PUBLICATIONS

Muchnick, Steven S., Advanced Compiler Design and Implementation, Morgan Kaufmann, Hardcover, Published Jul. 1997. ISBN 1-5586-0320-4.

Schneier, B., Applied Cryptography, 2d ed., John Wiley & Sons, Oct. 1995. ISBN 0-4711-1709-9 (paperback).

Olin Sibert et al., "DigiBox: A Self-Protecting Container for Information Commerce," Proceedings of the First USENIX Workshop on Electronic Commerce, New York, NY, Jul. 1995, pp. 1-9.

Olin Sibert et al., "Securing the Content, Not the Wire, for Information Commerce," InterTrust Technologies Corporation, 1996, pp. 1-12.

Stefik, M., "Trusted Systems," Scientific American, Mar. 1997, pp. 78-81.

Stefik, M., "Letting Loose the Light: Igniting Commerce in Electronic Publication," Xerox PARC, Palo Alto, CA, 1994-1995, pp. 1-35.

Stefik, M., "Letting Loose the Light: Igniting Commerce in Electronic Publication," Internet Dreams: Archetypes, Myths, and Metaphors. Massachusetts Institute of Technology, 1996, pp. 219-253.

Stefik, M., "Chapter 7, Classification, Introduction to Knowledge Systems," Morgan Kaufmann Publishers, Inc., 1995, pp. 543-607.

Office Action mailed Feb. 17, 2005, for U.S. Appl. No. 09/863,199, filed May 21, 2001.

Final Office Action mailed Nov. 15, 2005, for U.S. Appl. No. 09/863,199, filed May 21, 2001.

Advisory Action mailed Mar. 21, 2006, for U.S. Appl. No. 09/863,199, filed May 21, 2001.

Office Action mailed Jun. 14, 2006, for U.S. Appl. No. 09/863,199, filed May 21, 2001.

Notice of Allowance mailed Oct. 4, 2006, for U.S. Appl. No. 09/863,199, filed May 21, 2001.

TABLE 1202 -- SPKI NAME ASSERTIONS

| Issuer | Subject/Delegate | Name |
|---|---|---|
| Tech Corp. | Device No. 123 | Music Player |
| Cert Corp. | Tech Corp.'s Music Player | Certified Device |
| Retail Store | Cert Corp.'s Certified Device | Supported Device |

TABLE 1204 -- FIXPOINT COMPUTATION

| Row | Tech Corp.'s Music Player | Cert Corp.'s Certified Device | Retail Store's Supported Device |
|---|---|---|---|
| 1 | { } | { } | { } |
| 2 | {Device No. 123} | { } | { } |
| 2 | {Device No. 123} | {Device No. 123} | { } |
| 4 | {Device No. 123} | {Device No. 123} | {Device No. 123} |

FIG. 12

TABLE 1302 -- SPKI AUTHORIZATION ASSERTIONS

| Issuer | Subject | Delegation | Authorization |
|---|---|---|---|
| Music Co. | DRM Co. | Yes | Download |
| DRM Co. | Retail Store | Yes | Download |
| Retail Store | Supported Device | No | Download |

TABLE 1304 -- FIXPOINT COMPUTATION

| Row | Music Co. | DRM Co. | Retail Store |
|---|---|---|---|
| 1 | No | No | No |
| 2 | No | No | Yes |
| 2 | No | Yes | Yes |
| 4 | Yes | Yes | Yes |

FIG. 13

| $l \in License$ | intended meaning |
|---|---|
| 1) $\lambda m.\,W$ | Alice may write the file. |
| 2) $\lambda m.\,m(Bob)$ | Alice may do whatever Bob allows. |
| 3) $\lambda m.\,\bigsqcup\{W, m(Bob)\}$ | Alice may write and do anything else Bob allows. |
| 4) $\lambda m.\,\bigsqcap\{W, m(Bob)\}$ | Alice may write if Bob allows her to write. |
| 5) $\lambda m.\,\bigsqcap\{W, m(Bob), m(Carl)\}$ | Alice may write if both Bob and Carl say she can. |
| 6) $\lambda m.\,\text{if } card\{p \in \{Bob, Carl, Dave\} \mid R \sqsubseteq m(p)\} \geq 2$ then R else N | Alice may read if any two of Bob, Carl, and Dave say she can. |
| 7) $\lambda m.\,\text{if } W \sqsubseteq m(Bob) \text{ then R else N}$ | Alice may read if Bob says she may write. |
| 8) $\lambda m.\,\text{if } card\{p \mid R \sqsubseteq m(p)\} \geq 2 \text{ then R else N}$ | Alice may read if any two principals say she can. |

Figure 15. Example licenses

| $A \in \mathcal{P}(Assertion)$ | $lfp(A)$ computation Bob | Carl | Dave | Comment |
|---|---|---|---|---|
| $\langle Bob, \lambda m.\,W\rangle$ | N | N | N | A direct authorization. |
|  | W | N | N |  |
| $\langle Bob, \lambda m.\,W\rangle$ | N | N | N | Auths combined using $\bigsqcup$. |
| $\langle Bob, \lambda m.\,R\rangle$ | RW | N | N |  |
| $\langle Bob, \lambda m.\,W\rangle$ | N | N | N | Unconstrained delegation. |
| $\langle Carl, \lambda m.\,m(Bob)\rangle$ | W | N | N |  |
|  | W | W | N |  |
| $\langle Bob, \lambda m.\,m(Carl)\rangle$ | N | N | N | Least fixpoint. |
| $\langle Carl, \lambda m.\,m(Bob)\rangle$ |  |  |  |  |
| $\langle Bob, \lambda m.\,W\rangle$ | N | N | N | Constrained delegation. |
| $\langle Carl, \lambda m.\,\bigsqcap\{R, m(Bob)\}\rangle$ | W | N | N |  |
| $\langle Bob, \lambda m.\,RW\rangle$ | N | N | N | Constrained delegation. |
| $\langle Carl, \lambda m.\,\bigsqcap\{R, m(Bob)\}\rangle$ | RW | N | N |  |
|  | RW | R | N |  |
| $\langle Bob, \lambda m.\,W\rangle$ | N | N | N | Chained delegation. |
| $\langle Carl, \lambda m.\,m(Bob)\rangle$ | W | N | N |  |
| $\langle Dave, \lambda m.\,m(Carl)\rangle$ | W | W | N |  |
|  | W | W | W |  |
| $\langle Bob, \lambda m.\,W\rangle$ | N | N | N | Multiway delegation. |
| $\langle Carl, \lambda m.\,RW\rangle$ | W | RW | N |  |
| $\langle Dave, \lambda m.\,\bigsqcap\{m(Bob), m(Carl)\}\rangle$ | W | RW | W |  |
| $\langle Bob, \lambda m.\,W\rangle$ | N | N | N | Inter-assertion communication. |
| $\langle Bob, \lambda m.\,m(Carl)\rangle$ | W | N | N |  |
| $\langle Carl, \lambda m.\,\text{if } W \sqsubseteq m(Bob) \text{ then R else N}\rangle$ | W | R | N |  |
|  | RW | R | N |  |

Figure 16. Example least fixpoint computations of $\mathcal{M}_{Assertions}$ $$
\begin{aligned}
p &\in Principal \\
u &\in Auth \\
m &\in AuthMap = Principal \longrightarrow Auth \\
l &\in License = AuthMap \longrightarrow_m Auth \\
a &\in Assertion = Principal \times License
\end{aligned}
$$

$$\mathcal{M}_{Assertions} : \mathcal{P}(Assertion) \longrightarrow_m AuthMap$$
$$\mathcal{M}_{Assertions}(A) = lfp(\lambda m.\lambda p. \bigsqcup \{l(m) \mid \langle p, l \rangle \in A\})$$

$$\mathcal{M}_{Engine} : Principal \times Auth \times \mathcal{P}(Assertion) \longrightarrow Bool$$
$$\mathcal{M}_{Engine}(p, u, A) = u \sqsubseteq \mathcal{M}_{Assertions}(A)(p)$$

Figure 17. Framework $n \in \text{Name}$ $y \in \text{Sexp}$ $t \in \text{Time}$ $u \in \text{Auth} = \mathcal{P}(\text{Principal} \times (\text{Name} + \text{Sexp}) \times \text{Time})$ $f \in \text{FullName} = \text{Principal} \times \text{Name}^*$ $s \in \text{Subject} = \text{FullName} + (\text{Int} \times \mathcal{P}(\text{FullName}))$ $d \in \text{Delegate} = \text{Bool}$ $x \in \text{Action}$ $\text{TimePeriod} = \text{Time} \times \text{Time}$ $\text{NameAssertion} = \text{Principal} \times \text{Name} \times \text{Subject} \times \text{TimePeriod}$ $\text{AuthAssertion} = \text{Principal} \times \text{Subject} \times \text{Delegate} \times \text{Action} \times \text{TimePeriod}$ $\text{SPKIAssertion} = \text{NameAssertion} + \text{AuthAssertion}$ $\mathcal{M}_{Action} : \text{Action} \longrightarrow \mathcal{P}(\text{Sexp})$ (omitted)

$\mathcal{M}_{FullP} : \text{FullName} \times \text{AuthMap} \longrightarrow \mathcal{P}(\text{Principal} \times \text{Time})$ $\mathcal{M}_{FullP}(\langle p, [] \rangle, m) = \{ \langle p, t \rangle \mid t \in \text{Time} \}$ $\mathcal{M}_{FullP}(\langle p, [n_0, n_1, \ldots] \rangle, m) = \left\{ \langle p', t \rangle \,\middle|\, \exists p''. \begin{array}{l} \langle p'', n_0, t \rangle \in m(p) \text{ and} \\ \langle p', t \rangle \in \mathcal{M}_{FullP}(\langle p'', [n_1, \ldots] \rangle, m) \end{array} \right\}$ $\mathcal{M}_{SubjP} : \text{Subject} \times \text{AuthMap} \longrightarrow \mathcal{P}(\text{Principal} \times \text{Time})$ $\mathcal{M}_{SubjP}(f, m) = \mathcal{M}_{FullP}(f, m)$ $\mathcal{M}_{SubjP}(\langle k, F \rangle, m) = \{ \langle p, t \rangle \mid k \leq \text{card}\{ f \in F \mid \langle p, t \rangle \in \mathcal{M}_{FullP}(f, m) \} \}$ $\mathcal{M}_{Name} : \text{NameAssertion} \longrightarrow \text{Assertion}$ $\mathcal{M}_{Name}(p, n, s, \langle t_1, t_2 \rangle) = \langle p, \lambda m. \{ \langle p', n, t \rangle \mid t_1 \leq t \leq t_2 \text{ and } \langle p', t \rangle \in \mathcal{M}_{SubjP}(s, m) \} \rangle$ $\mathcal{M}_{FullA} : \text{FullName} \times \text{AuthMap} \longrightarrow \text{Auth}$ $\mathcal{M}_{FullA}(f, m) = \{ \langle p, y, t \rangle \mid \exists p'. \langle p', t \rangle \in \mathcal{M}_{FullP}(f, m) \text{ and } \langle p, y, t \rangle \in m(p') \}$ $\mathcal{M}_{SubjA} : \text{Subject} \times \text{AuthMap} \longrightarrow \text{Auth}$ $\mathcal{M}_{SubjA}(f, m) = \mathcal{M}_{FullA}(f, m)$ $\mathcal{M}_{SubjA}(\langle k, F \rangle, m) = \{ \langle p, y, t \rangle \mid k \leq \text{card}\{ f \in F \mid \langle p, y, t \rangle \in \mathcal{M}_{FullA}(f, m) \} \}$ $\mathcal{M}_{Auth} : \text{AuthAssertion} \longrightarrow \text{Assertion}$ $\mathcal{M}_{Auth}(p, s, d, x, \langle t_1, t_2 \rangle) = \langle p, l \rangle$, where $l(m) = \left\{ \langle p', y, t \rangle \,\middle|\, \begin{array}{l} y \in \mathcal{M}_{Action}(x) \text{ and } t_1 \leq t \leq t_2 \\ \text{and if } d \text{ then } \langle p', y, t \rangle \in \mathcal{M}_{SubjA}(s, m) \text{ else } \langle p', t \rangle \in \mathcal{M}_{SubjP}(s, m) \end{array} \right\}$ Figure 18. SPKI instantiation $$
\begin{aligned}
v &\in \textit{Value} \\
x &\in \textit{Action} &&= \mathcal{P}(\textit{String} \times \textit{String}) \\
&\phantom{\in{}} \textit{Request} &&= \mathcal{P}(\textit{Principal}) \times \textit{Action} \\
u &\in \textit{Auth} &&= \textit{Request} \longrightarrow \textit{Value} \\
z &\in \textit{Licensees} \\
c &\in \textit{Conditions} \\
&\phantom{\in{}} \textit{KeyNoteAssertion} &&= \textit{Principal} \times \textit{Licensees} \times \textit{Conditions}
\end{aligned}
$$

$\mathcal{M}_{\textit{Licensees}} : \textit{Licensees} \times (\textit{Principal} \longrightarrow \textit{Value}) \longrightarrow_m \textit{Value}$ (omitted)
$\mathcal{M}_{\textit{Conditions}} : \textit{Conditions} \times \textit{Request} \longrightarrow \textit{Value}$ (omitted)

$\mathcal{M}_{\textit{Keynote}} : \textit{KeyNoteAssertion} \longrightarrow \textit{Assertion}$
$\mathcal{M}_{\textit{Keynote}}(p, z, c) = \langle p, \lambda m.\, \lambda(P, x).\, \sqcap \{\mathcal{M}_{\textit{Conditions}}(c, x), \mathcal{M}_{\textit{Licensees}}(z, \lambda p.\, m(p)(P, x))\} \rangle$ Figure 19. KeyNote instantiation

TRUST MANAGEMENT SYSTEMS AND METHODS

RELATED APPLICATIONS

This application is a continuation of application Ser. No. 11/614,860, filed Dec. 21, 2006, now U.S. Pat. No. 7,395,550, which is a continuation of application Ser. No. 09/863,199, filed May 21, 2001, now U.S. Pat. No. 7,313,692, which claims the benefit of U.S. Provisional Application No. 60/205,402, filed Mar. 19, 2000, the contents of these application are hereby incorporated by reference in their entirety.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to the management of digital content and electronic transactions. More specifically, systems and methods are disclosed for making trust management decisions.

BACKGROUND OF THE INVENTION

In modern computing systems, it is often desirable to limit access to electronic content or processing resources, or to allow only certain parties to perform certain actions. A number of techniques have been used or proposed for enabling such control. One set of techniques makes use of digital certificates. A digital certificate can be viewed as an authorization to perform an action or to access a resource. An entity may possess numerous certificates. In order to determine whether an entity is authorized to perform an action, one looks at the certificates in the entity's possession, and determines whether authorization has been granted. Because authorization may be implicit or delegated (e.g., one entity may authorize another entity to issue authorizations on its behalf), it is often necessary to evaluate multiple certificates to determine whether a request for system resources should be granted.

Trust management systems define languages for expressing authorizations and access control policies, and provide trust management engines for determining when a particular request is authorized. The task of the trust management engine will typically involve evaluating both the request and a set of certificates associated with the request and/or the requestor. In some conventional trust management systems, the trust management engine makes decisions using a process similar to that shown in FIG. 1. As shown in FIG. 1, trust management engine 102 accepts a request 104 to perform an action or to access a resource. The trust management engine also accepts a set of certificates 106 associated with the requestor or the request, and some indication 108 of the identity of the owner or "root" associated with the requested resource (i.e., the authorizing principal from whom permission to access the resource must ultimately flow). Next, the trust management engine performs a certificate path discovery process 110 on the group of certificates 106 to determine the way in which the certificates should be arranged in order to facilitate the remainder of the trust management decision process. The result of certificate path discovery is an ordered list of certificates 112. The ordered list of certificates 112 is then reduced by successively combining adjacent certificates in the list 114. The end result of the reduction process is a certificate 116 representing the combination of each of the assertions expressed by the certificates in the original group. This certificate is then evaluated 118 to determine whether the original request should be granted or denied 120.

A problem with approaches such as the one shown in FIG. 1 is that the computation involved can be relatively costly.

SUMMARY OF THE INVENTION

Systems and methods are provided for reducing the cost and/or complexity of the trust management decision process. The systems and methods of the present invention are applicable to the Simple Public Key Infrastructure (SPKI) architecture and to a wide variety of other trust management architectures. It should be appreciated that the present invention can be implemented in numerous ways, including as a process, an apparatus, a system, a device, a method, a computer readable medium, or as a combination thereof. Several inventive embodiments of the present invention are described below.

In one embodiment, a method is described for controlling access to computing resources. A request for a computing resource is obtained, as is a group of certificates. The certificates express authorizations for performing certain actions or for accessing certain resources, and are issued by system principals. The principals are identified and assigned an initial state. Next, the certificates are iteratively evaluated, and the states of the principals updated, until a fixpoint is reached or until a predefined one of the principals is determined to have authorized the request.

In another embodiment, a system is provided for controlling access to electronic content and processing resources. The system includes means for receiving a request from a principal to access a piece of electronic content or a processing resource, and means for collecting a set of certificates relating to the request, the requesting principal, or the electronic content or processing resource. The further includes means for identifying a root principal from whom authorization is needed in order to grant the request. A least fixpoint computation is used to determine whether the root principal has authorized access to the piece of electronic content or processing resource by the requesting principal.

In yet another embodiment, a system is provided for controlling access to electronic resources. A first computer system is operable to process requests for system resources and to grant or deny access. The first computer system includes a network interface for receiving digital certificates from other systems and for receiving requests to access electronic resources. The first computer system also includes a memory unit for storing electronic resources and one or more certificates relating thereto. The first computer system includes a trust management engine for processing digital certificates and requests for electronic resources, and for making access control decisions based on least fixpoint computations. In some embodiments, requests for system resources may be received from a second computer system. A third computer system might generate a digital certificate that authorizes the second computer system to access the system resource, and might send this digital certificate to the second and/or first computer systems. In addition, a fourth computer system might generate another digital certificate that authorizes the third computer system to make the authorization described above.

In another embodiment, a computer program product is provided for making trust management determinations. The computer program includes computer code for obtaining requests to perform a certain actions, and computer code for obtaining a group of authorizations associated with the requested actions. The computer program also includes computer code for identifying a set of principals associated with the authorizations, and for initializing the state of each principal. Computer code is also provided for evaluating the authorizations based on the state of the principals, and for updating the state of the principals. The computer code for evaluating the authorizations and for updating the state of the principals is repeated until a fixpoint is reached or until a predefined principal is deemed to authorize the request. The computer program is stored on a computer-readable medium such as a CD-ROM, DVD, MINIDISC, floppy disk, magnetic tape, flash memory, ROM, RAM, system memory, web server, hard drive, optical storage, or a data signal embodied in a carrier wave.

In another embodiment, a method for performing trust management computations is described. A group of certificates is collected, each of the certificates including at least one authorization. The authorizations contained in the certificates are expressed using a structure that satisfies certain predefined properties. In one embodiment, this structure is a lattice. The certificates are expressed as a functions, and a least fixpoint is computed using these function. In one embodiment, the functions are monotone. Trust management decision are made using the results of the least fixpoint computation.

In another embodiment, a lattice is constructed that represents the authorizations granted by each of the authorizing principals in a system. To facilitate the construction of this lattice, the licenses derived from the authorizations are represented by monotone functions. A fixpoint algorithm is used to make trust management decisions based on the lattice. In some embodiments, only a portion of the fixpoint is computed, the portion being sufficient to determine if the particular request is authorized. Thus, trust management decisions can be made without the necessity of performing certificate path discovery.

In another embodiment, a framework is presented that enables trust management systems to be concisely specified, which helps in comparing existing systems and in designing new systems. The semantics of a trust management engine are defined as a least fixpoint in a lattice, and this definition is used to implement a trust management engine. Trust management engines implemented in this manner are able to make trust management decisions more efficiently than trust management engines that rely on certificate path discovery and tuple reduction.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 12 shows a set of SPKI name assertions, and a method for processing these assertions in accordance with an embodiment of the present invention.

FIG. 13 shows a set of SPKI authorization assertions, and a method for processing these assertions in accordance with an embodiment of the present invention.

FIG. 15 provides examples of license in accordance with embodiments of the present invention.

FIG. 16 provides examples of least fixpoint computations in accordance with embodiments of the present invention.

FIG. 17 illustrates a framework for expressing trust management systems in accordance with an embodiment of the present invention.

FIG. 18 illustrates how SPKI can be expressed using the framework of FIG. 17.

FIG. 19 illustrates how Keynote can be expressed using the Framework of FIG. 17.

DETAILED DESCRIPTION

A detailed description of the invention is provided below. While the invention is described in conjunction with several embodiments, it should be understood that the invention is not limited to any one embodiment. On the contrary, the scope of the invention is limited only by the appended claims and encompasses numerous alternatives, modifications, and equivalents. For example, while embodiments are described in the context of making trust management decisions using the Simple Public Key Infrastructure (SPKI) and Keynote, those of ordinary skill in the art will recognize that the disclosed systems and methods are readily adaptable for broader application. For example, without limitation, the present invention could be readily applied in the context of other trust management systems. In addition, while numerous specific details are set forth in the following description in order to provide a thorough understanding of the present invention, the present invention may be practiced according to the claims without some or all of these details. Finally, for the purpose of clarity, certain technical material that is known in the art has not been described in detail in order to avoid obscuring the present invention. For example, reference will be made to a number of terms and concepts that are well known in the field of cryptography. Background information on cryptography can be found, for example, in Menezes et al., *Handbook of Applied Cryptography* (CRC Press 1996) ("Menezes"); and Schneier, *Applied Cryptography*, 2d ed. (John Wiley & Sons 1995). Use will also be made, on occasion, of certain mathematical notation. Readers unfamiliar with this notation should refer to Appendix A.

The present invention provides systems and methods for making efficient trust management decisions. The processing logic of the present invention is operable to accept requests for system resources, authorizations or certificates, and the identity of one or more root authorities. To determine whether a request should be granted, the processing logic identifies a set principals from whom authorization may flow, and interprets each of the authorizations or certificates as a function of the state of one or more of the principals. The processing logic iteratively evaluates the functions represented by the certificates, updates the state of the principals, and repeats this process until a reliable determination can be made as to whether the request should be granted or denied. In a preferred embodiment the certificates are evaluated until the state of the root authority indicates that the request should be granted, or until further evaluation of the certificates is ineffective in changing the state of the principals.

Figure 1:
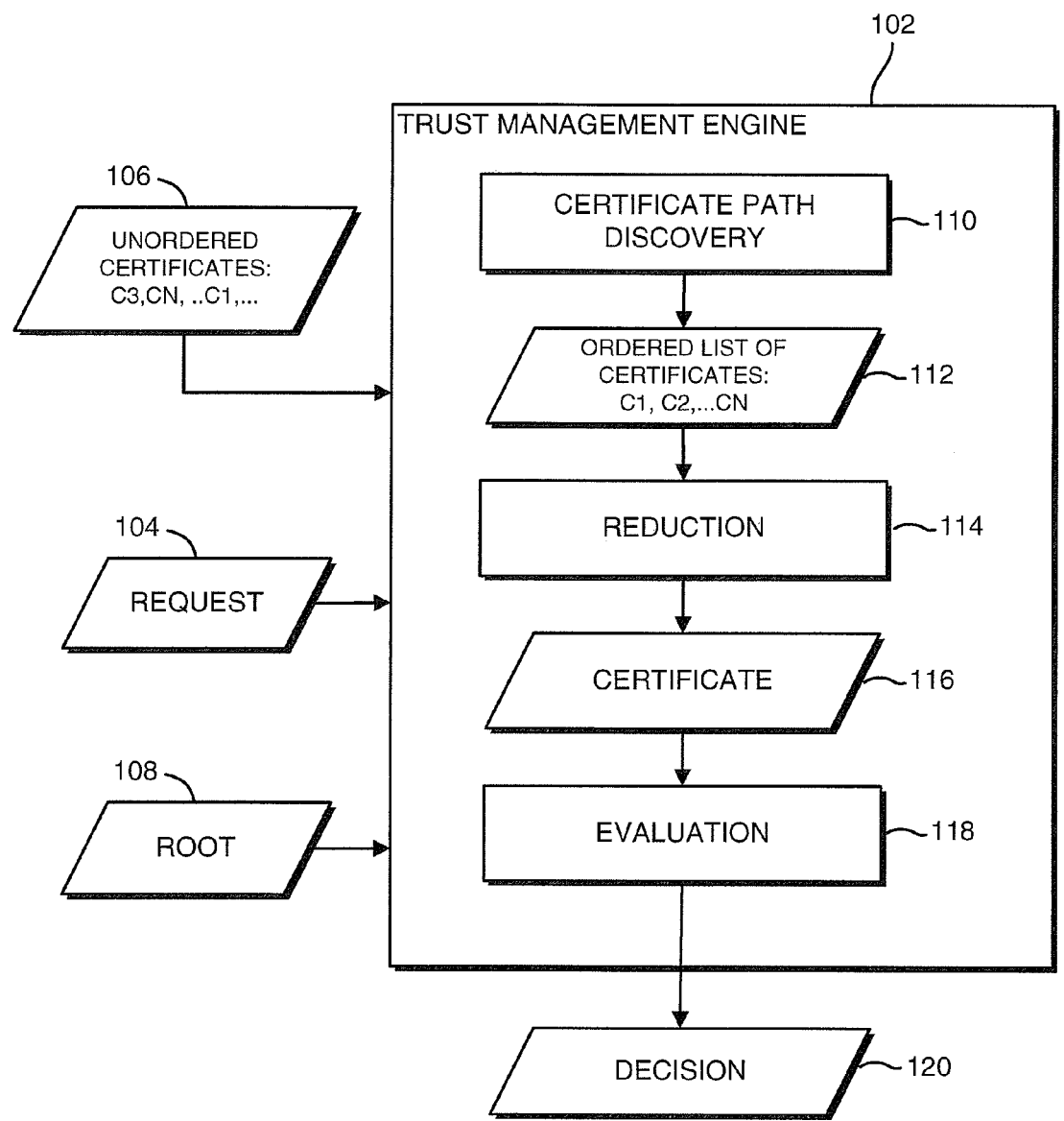
FIG. 1 illustrates a conventional technique for making trust management decisions.
Figure 2:
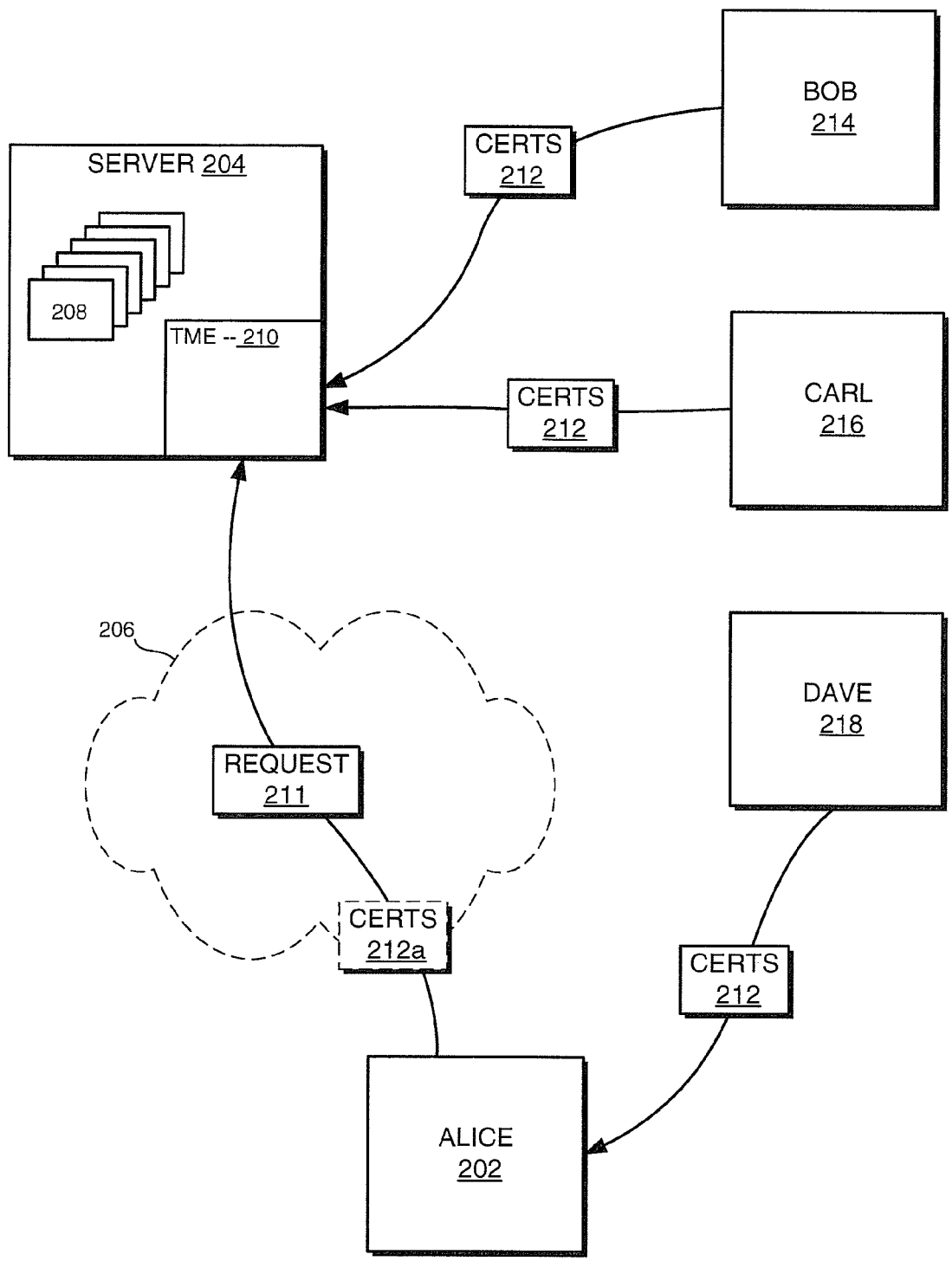
FIG. 2 illustrates a system for practicing embodiments of the present invention.

For purposes of illustration, the structure and operation of an embodiment of the present invention will be described in the context of a user ("Alice") attempting to access a piece of content on a remote system. As shown in FIG. 2, the user's system 202 may, for example, establish a connection with a remote system or server 204 via a network 206 such as the Internet. The user may then request permission to read or modify content 208 stored on the server.

Figure 3:
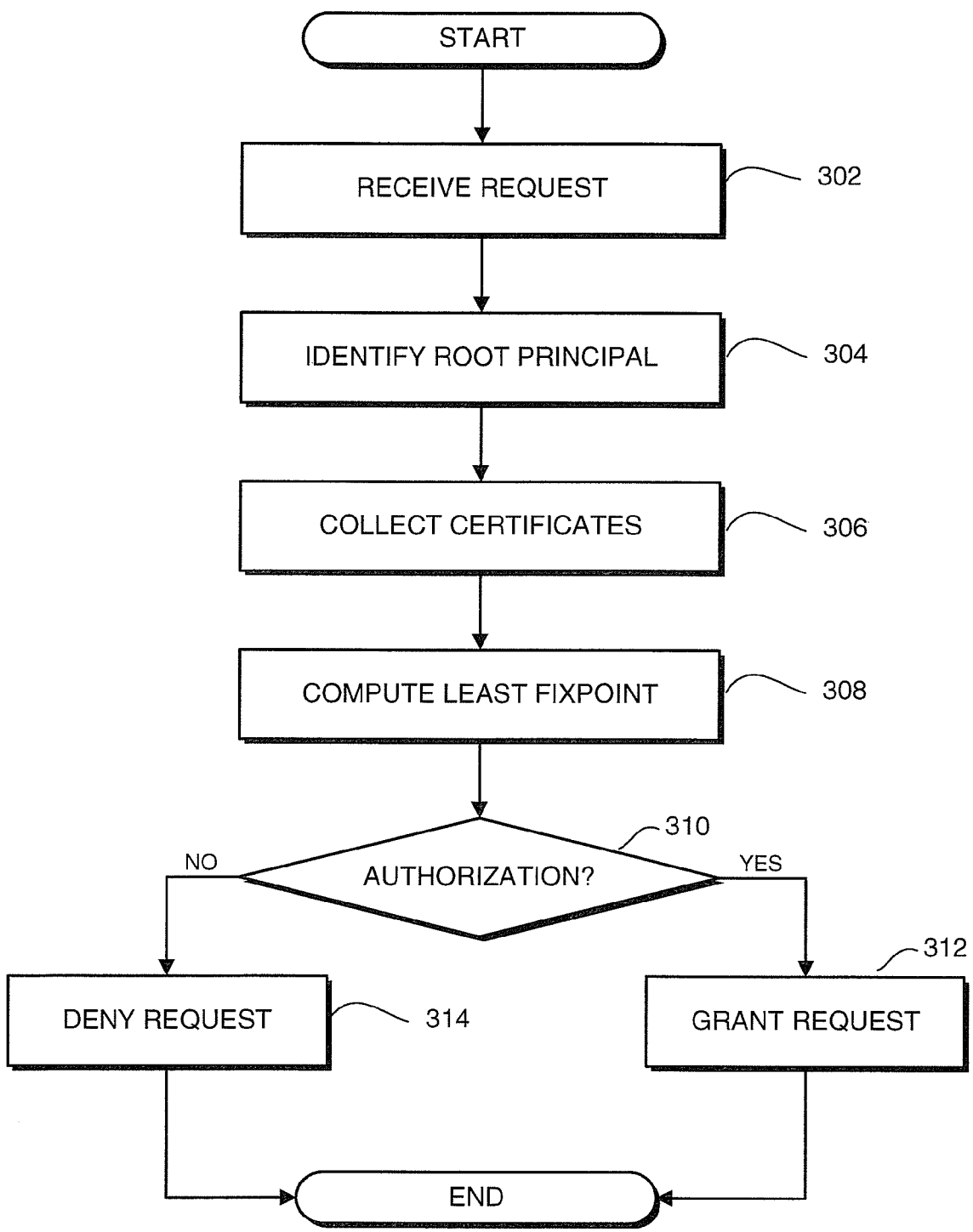
FIG. 3 illustrates a method for making trust management decisions in accordance with an embodiment of the present invention.

As shown in FIG. 3, the server, upon receiving a user's request to access content or other system resources (302), evaluates whether the user is authorized to access the requested content or resources. Typically, the server program responsible for controlling access to the server's resources will maintain records of the access control policies associated with various content items or other resources. These records specify the party or parties from whom authorization must be obtained, the nature of the authorizations, and/or the other conditions that must be satisfied in order for access to be granted. To determine whether the user is authorized to access the requested content or resources, the server identifies the entity from whom permission to access the requested item is needed (i.e., the root authority) (304), and collects the certificates that are needed to make the determination (306). As shown in FIG. 2, a trust management engine 210 is then used to examine the available authorizations/certificates to determine whether the root has granted the user permission to access the requested item. For example, if the requested item is a document, the author's permission may be needed before server 204 will allow a user 202 to modify the document. In a preferred embodiment, the trust management engine treats the certificates as functions and computes a least fixpoint (308). If the trust management engine determines that the root principal has authorized the user to perform the requested action (i.e., a "Yes" exit from block 310), then the server allows the user to access the requested resource or perform the requested action (312). Otherwise, the request is denied (314).

Note that server 204 can obtain the certificates 212 needed to evaluate a user's request 211 in any of a variety of ways. For example, server 204 might obtain one or more of these certificates 212a directly from the user, the user having obtained these certificates previously from various other principals in the system (e.g., principal 218). Alternatively, or in addition, the server may already have obtained some of the certificates before the user made his or her request, and/or the server may contact the other relevant principals (e.g. 214, 216) and request such certificates after the user's request is received. In short, certificates can be obtained in any suitable manner.

Note, too, that the certificates themselves can take any of a wide variety of forms. For example, conventional digital certificates typically contain an indication of the nature of the authorization that is being granted and the identity of the entity to whom the authorization is directed. For example, the certificate may contain the public key of the authorized entity. The authorized entity can then "redeem" the authorization by demonstrating its possession of the corresponding private key. Conventional certificates are typically signed with the private key of the principal granting the authorization, thus enabling anyone who verifies the signature with the principal's public key to be confident that the certificate originated from the principal and has not been modified.

The operation of an exemplary trust management engine will now be described in more detail. The discussion will occasionally refer to principals, authorizations, authorization maps, licenses, and assertions. In general terms, a principal can be viewed as an entity that may make or authorize requests. Principals should be distinguishable from one another, and in some embodiments may be identified by a public key. An authorization expresses the permissions granted by a principal. Authorizations can form a lattice. In an illustration presented in FIGS. 5A-5I below, for example, the authorizations form the lattice {N, R, W, RW}, where N means that no authorization is given, R denotes authorization to read a file, W denotes authorization to write to a file, and RW denotes authorization to read and write. Here, the level of authorization increases from left to right—that is, N represents a lesser level of authorization than R, R and W have the same level of authorization, and RW represents the greatest level of authorization An authorization map is a function that maps principals to authorizations, and that describes the authorizations made by each principal in a trust management decision. In the examples that will be described in connection with FIGS. 5A-5I below, for example, the authorization maps express the authorization each principal grants to another principal named "Alice". A license grants authorization expressed as a monotone function from authorization maps to authorizations. Intuitively, the meaning of license, l, is that if principals grant authorizations as given by an authorization map, m, then/grants the authorization l(m). Here, monotonicity means that the authorizations granted by a license increase (or stay the same) as a consequence of an increase in other principals' authorizations. In preferred embodiments, monotonicity is required, as it gives a sensible meaning to a collection of assertions so that the trust management engine is well-defined.

An assertion is an expression of authorization made by a principal. Assertions can be thought of as an abstraction of digital certificates. Formally, an assertion can be viewed as consisting of a principal and a license. In practice, assertions will typically be signed by the public key of the issuing principal, and may require signature checking before being processed by the trust management engine.

A trust management engine makes a decision based on a request, an authorizing principal, and a set of assertions. The authorizing principal reflects the policy governing the request. A request is expressed as an element of the authorization lattice. A trust management engine takes a set of assertions made by various principals, some of whom may delegate to each other, and finds a coherent authorization map that represents the authorizations of these principals. The trust management engine then determines if the request requires less authorization than is granted by the authorizing principal, p. For example, in the lattice described above (i.e., {N, R, W, RW}), if Alice would like to write to a file under Bob's control, and the assertions $a_1$, $a_2$, and $a_3$ are available, the trust management engine would compute the least fixpoint using the request and these assertions to determine whether Bob has authorized Alice to write. The assertions may reside in the trust management engine's local machine, or may be presented to the trust management engine's local machine by, e.g., the principal making the request.

Note that the trust management engine does not necessarily need to compute the entire fixpoint for the given assertions. To prove that a request is authorized, the engine simply finds an authorization map in which the requested action is authorized. Finding such an authorization map may be easier than computing the entire fixpoint, since (a) the trust management engine may be able to work in a lattice in which elements are more compactly represented and licenses more efficiently computed, and (b) the engine may terminate the fixpoint computation once a large enough authorization map has been found. This is illustrated below in the discussion of SPKI.

The expressiveness of a trust management system will typically depend on the choice of a lattice of authorizations, and the choice of a subset of the monotone functions to be used as licenses. In general, the optimal choices will vary from application to application; however, it should be understood that for purposes of practicing the present invention any suitable choices can be made. Similarly, the choice of a representation for authorizations, and a language for licenses, such that the desired monotone functions can be expressed concisely, and such that the fixpoint can be computed efficiently, will also vary from application to application. However, any suitable choice or choices can be made without departing from the principles of the present invention.

Figure 4:
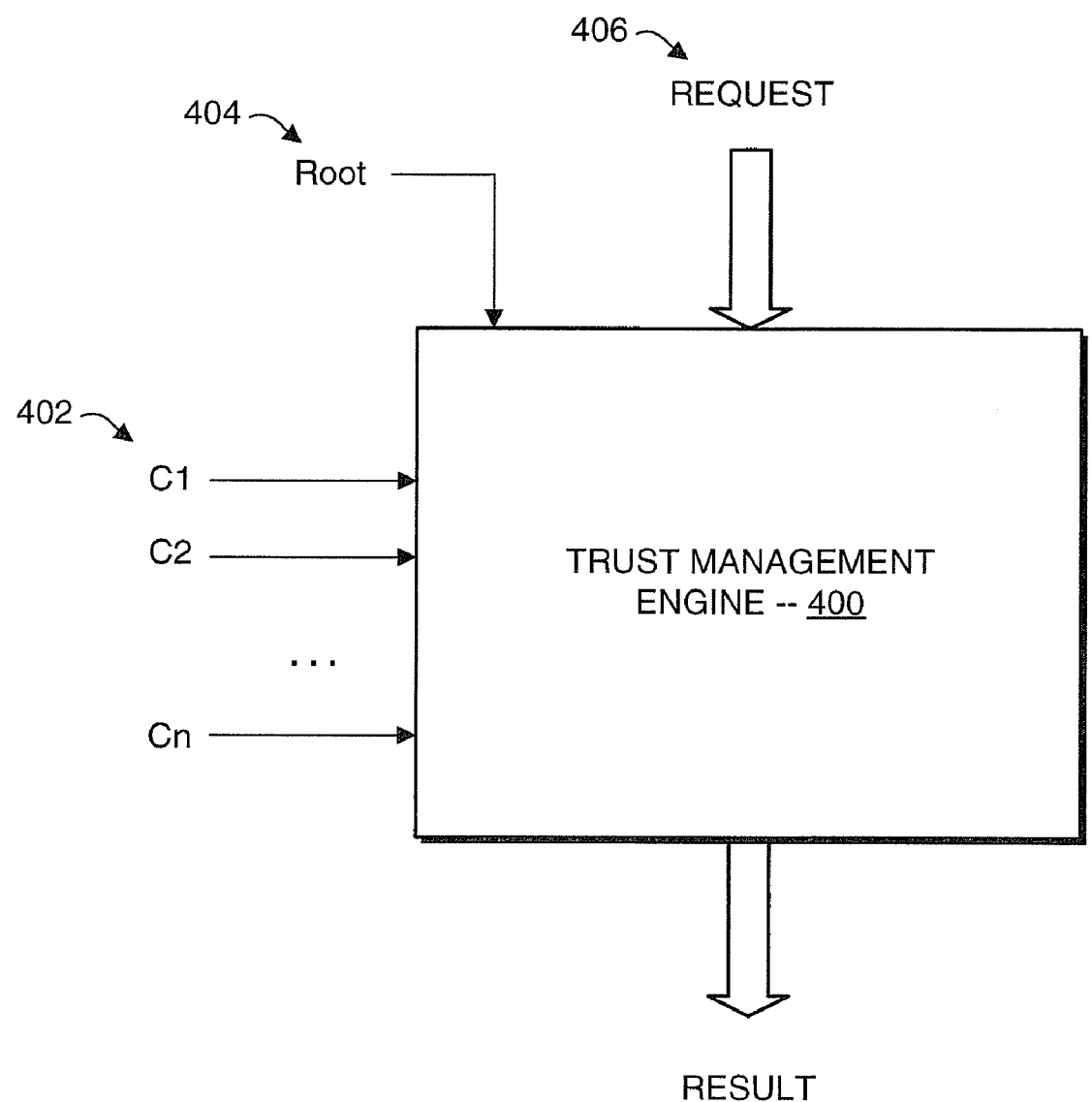
FIG. 4 illustrates a trust management engine in accordance with an embodiment of the present invention.

FIG. 4 shows a trust management engine. Trust management engine 400 is responsible for taking a set of certificates/assertions 402 and a specification of a root principal 404, and determining whether these certificates indicate that the root principal authorizes a requested action 406. As indicated above, trust management decisions can be made by interpreting authorizations as monotone increasing functions of the authorization state of the principals from whom authorization is to be obtained, and evaluating a least fixpoint of the principals' assertions (or an approximation of the least fixpoint).

Several examples of this process are described below in connection with FIGS. 5A-5I. To facilitate explanation, in these examples each principal in the system will be associated with a single authorization that describes the permissions granted by that principal. In addition, the authorization lattice will specify the authorizations granted to a single principal—Alice—for a particular file. It should be appreciated, however, that these constraints are not necessary, and that the concepts and techniques that are illustrated by these examples can be readily applied to systems in which principals are associated with multiple authorizations and/or the authorization lattice specifies authorizations for multiple principals and/or for multiple resources.

FIGS. 5A-5I show some example computations of a least fixpoint for a set of assertions 530a-534i. The order of the assertions is not important. In the examples shown in FIGS. 5A-5I, there are four principals—Alice, Bob, Carl, and Dave—and it is desired to determine what authorizations Bob, Carl, and Dave have granted to Alice. The authorizations or permissions that can be granted in these examples are the ability to read from and/or write to a file (i.e., {N, R, W, RW}). In FIGS. 5A-5I, the fixpoint computation 502a-502i is shown as a sequence of authorization maps, one per row, where each column contains the authorizations made by a principal. Each row contains an authorization map consisting of the least upper bound of all of the assertions applied to the authorization map in the previous row. The final row is the least fixpoint authorization map of the set of assertions. The examples show how least fixpoint computation can express concepts like path validation, chaining and five-tuple reduction, and inter-assertion communication.

Figure 5A:
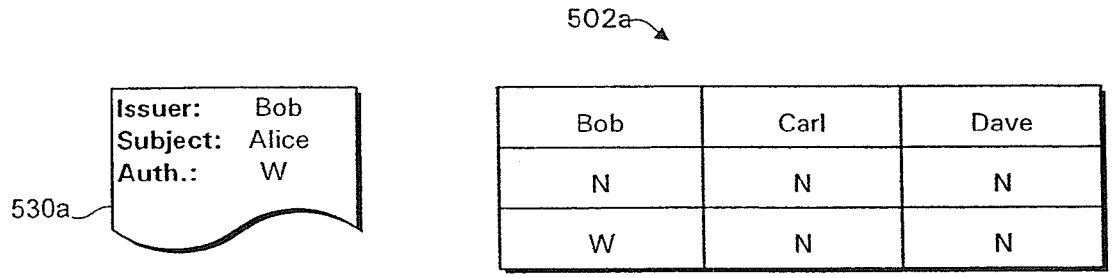
FIGS. 5A, 5B, 5C, 5D, 5E, 5F, 5G, 5H, and 5I illustrate the process of making trust management decisions in accordance with embodiments of the present invention.

In the example shown in FIG. 5A, there is only one relevant certificate 530a. It indicates that Bob has authorized Alice to write. Here, the fixpoint computation is simple. The state of the principals is initialized to "No" (i.e., row 1 of table 502a). Next, the certificate is evaluated and the authorization map is updated to indicate that Bob has authorized writing (row 2). Since further evaluation of the certificate will not change the state of any of the principals, a fixpoint has been reached, and a trust management decision can be made. For example, if Alice were seeking Bob's permission to write to the file, her request would be granted. However, if Alice were seeking to read from the file, or if she wanted to write to the file but needed the permission of Carl or Dave, then her request would be denied.

Figure 5B:
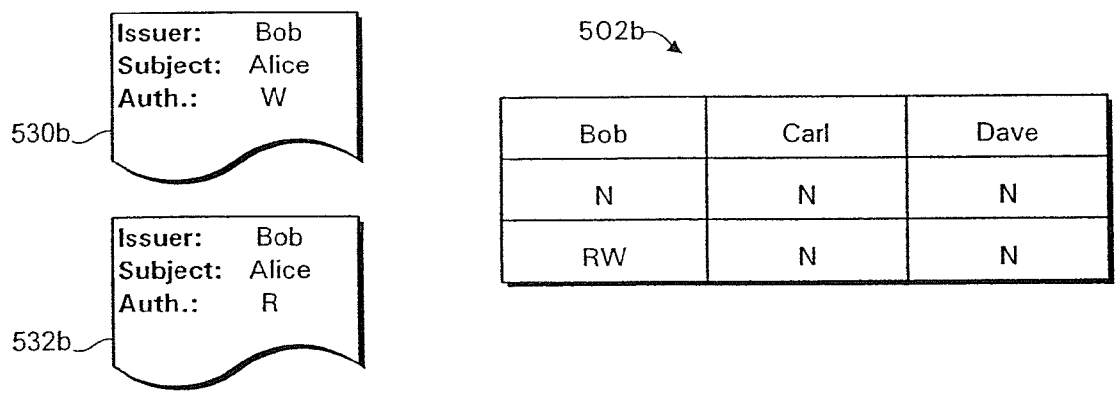

FIG. 5B shows an example in which Bob has issued two certificates. One certificate indicates that Bob has given Alice permission to read, the other certificate indicates that Bob has give her permission to write. The least fixpoint is computed in the manner described above.

Figure 5C:
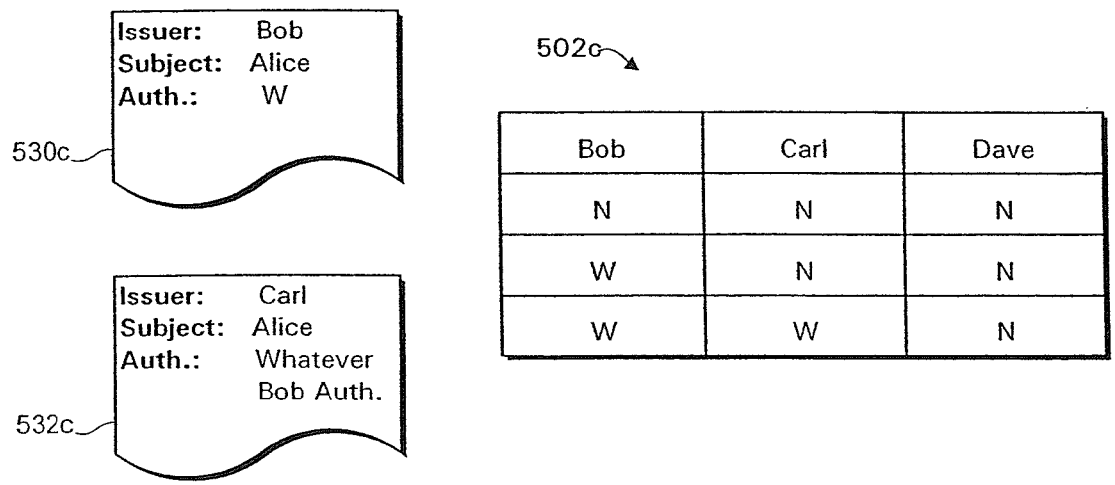

In FIG. 5C, Alice has two certificates: one indicates that Bob has granted her permission to write 530c; the other indicates that Carl has granted her permission to do whatever Bob has authorized her to do 532c. As shown in FIG. 5C, to compute the least fixpoint, the state of each of the principals is initialized to "No" (row 1). Next, each of the certificates is evaluated based on the current state of the principals (i.e. the state specified in row 1 of table 502c), and any updated state information is placed in the next row of the table (i.e., row 2). As shown in FIG. 5C, evaluation of the certificates results in table 502c being updated to show that Bob has authorized write access (see row 2). Note, however, that row 2 does not indicate that Carl has authorized write access. This is because certificate 532c indicates that Carl will authorize whatever Bob authorizes, but row 1 indicates that Bob has not authorized anything. However, when the certificates are evaluated again—this time using the data in row 2 of the table—the authorization map will be updated to show that Carl has granted write access (row 3). Since further evaluation of the certificates using the data contained in row 3 of the table will not lead to further changes in the authorization map, the least fixpoint has been reached and additional processing is unnecessary.

Figure 5D:
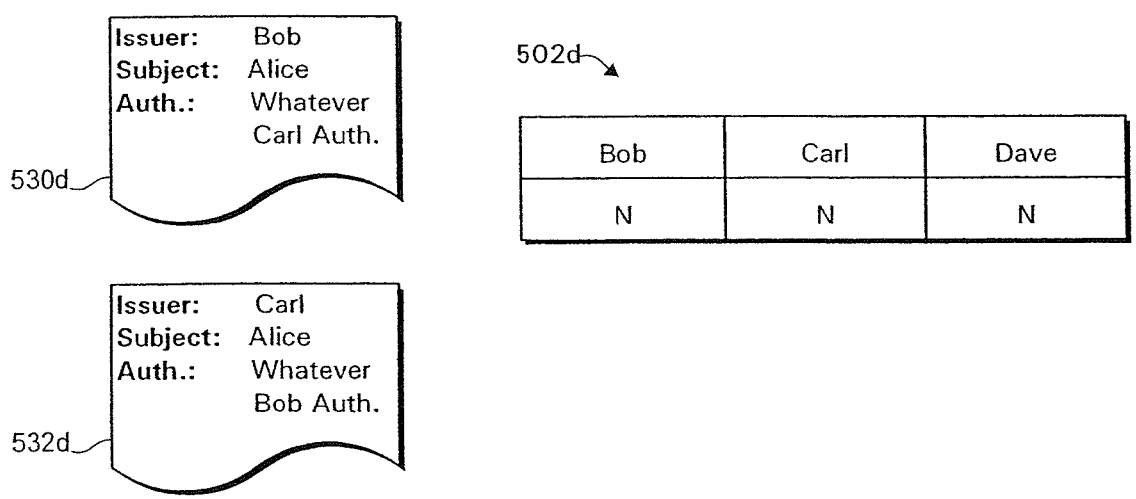

FIG. 5D shows a situation in which the least fixpoint computation 502d indicates that none of the parties has granted authorization. Here, Bob has indicated that he will authorize whatever Carl has authorized 530d; however, Carl has indicated that he will only authorize what Bob has authorized 532d. Because the state is initialized to "No", evaluation of the certificates will not change the state, and thus the least fixpoint consists of the first row of table 502d.

Figure 5E:
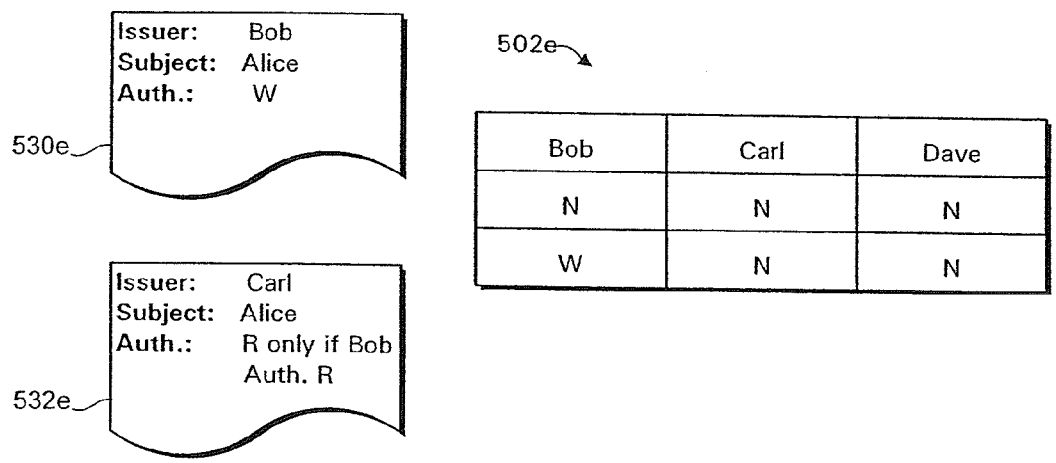
Figure 5F:
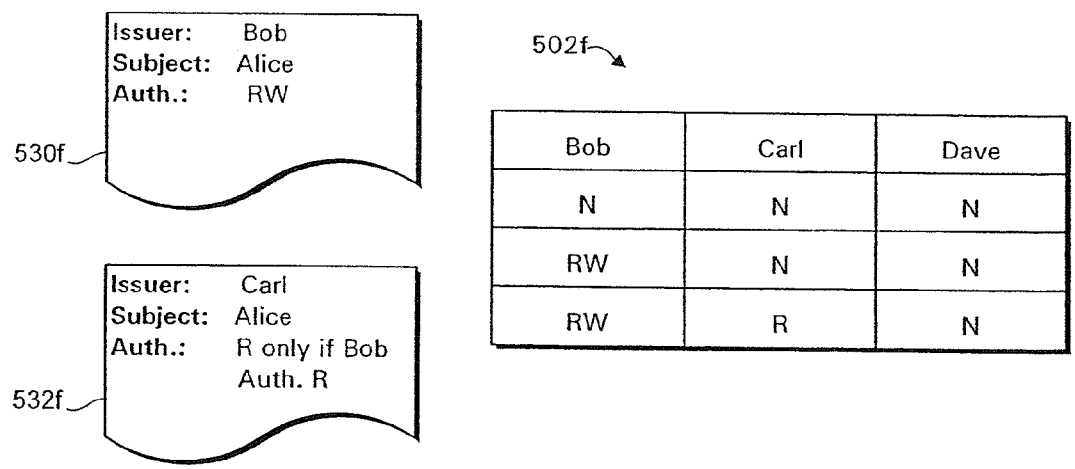

FIGS. 5E and 5F illustrate the concept of constrained delegation. In FIG. 5E, Bob has granted Alice authorization to write 530e, and Carl has granted Alice authorization to read, but only if Bob has also granted Alice authorization to read

532e. As shown in FIG. 5E, the fixpoint for this set of certificates is an authorization map in which Alice has been given authorization to write from Bob, but has no other authorizations. Similarly, in FIG. 5F Bob has granted Alice authorization to read and write 530f, while Carl has granted Alice authorization to read to the extent that Bob has also authorized Alice to read 532f. When the least fixpoint is computed 502f, Alice will have authorization from Bob to read and write, and authorization from Carl to read.

Figure 5G:
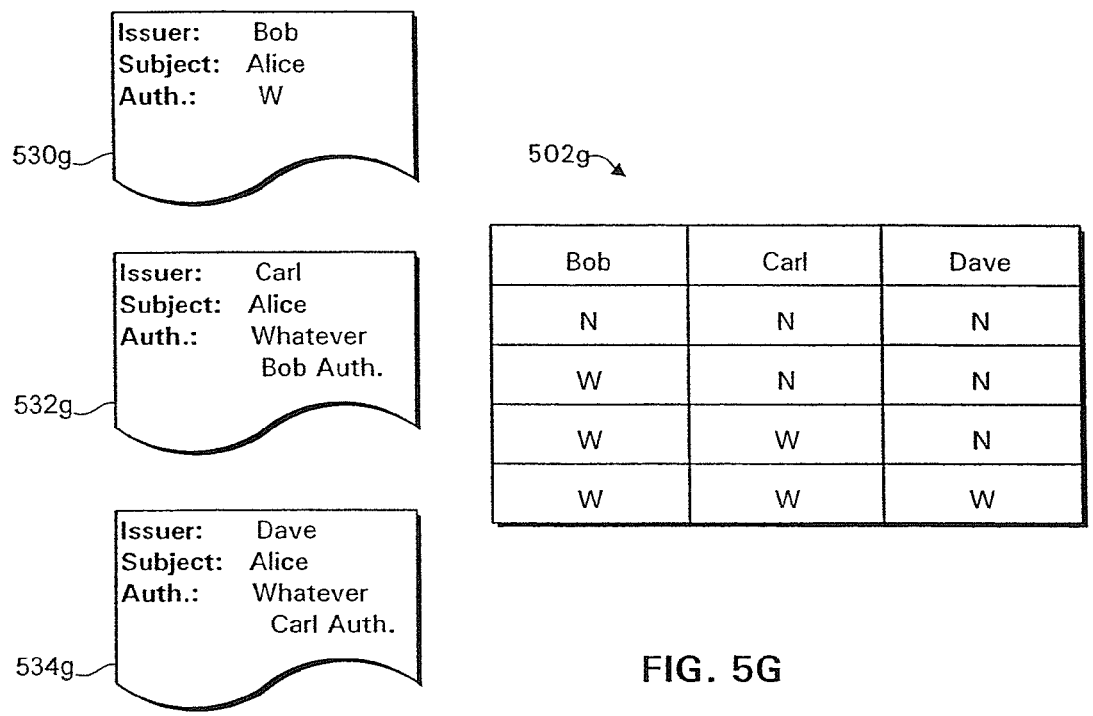
Figure 6:
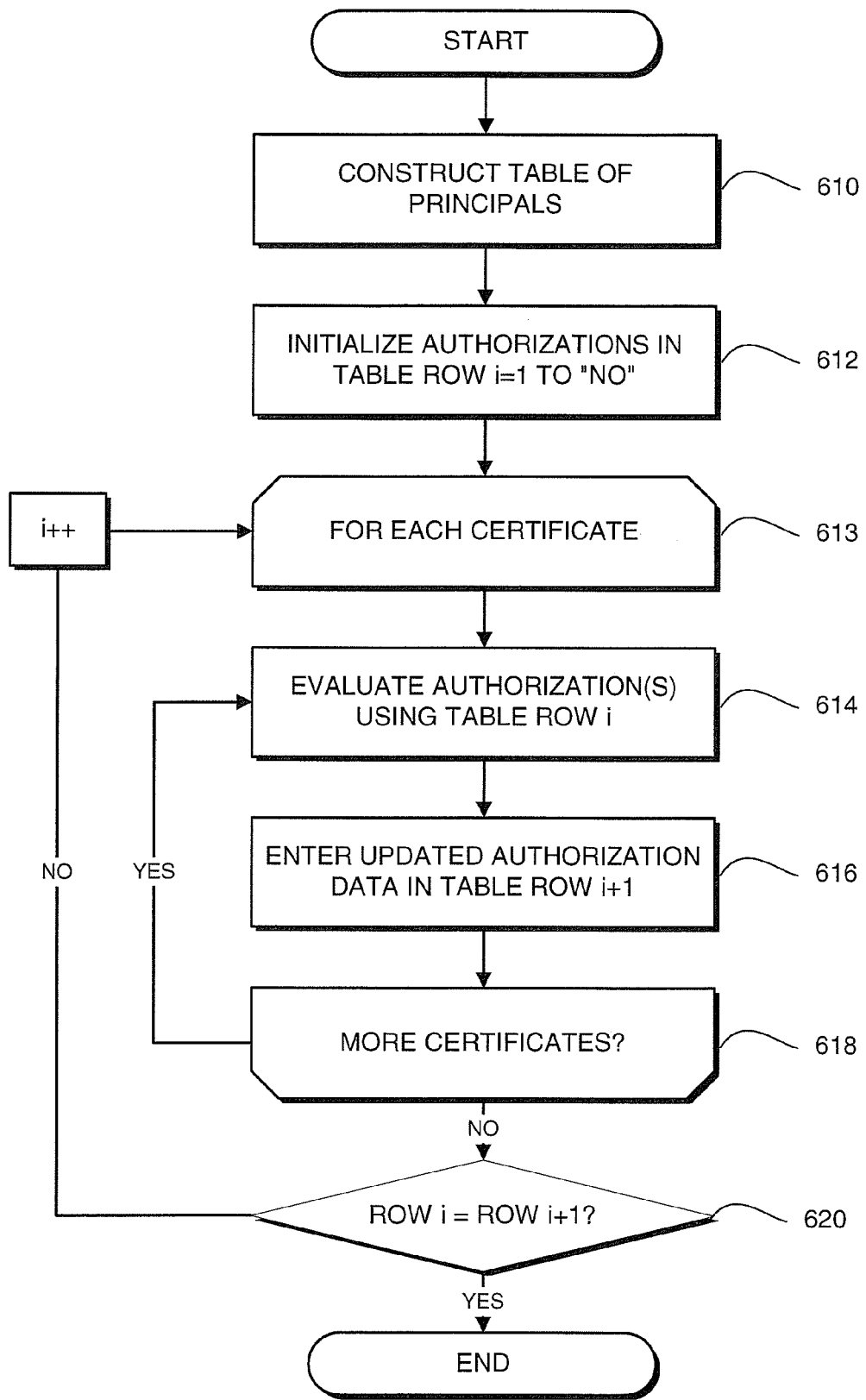
FIG. 6 illustrates a method for making trust management decision in accordance with an embodiment of the present invention.

FIG. 5G illustrates a chain of delegation. In FIG. 5G, the trust management engine is presented with three certificates. Certificate 530g indicates that Bob has authorized Alice to write. Certificate 532g indicates that Carl has authorized Alice to do whatever Bob has authorized her to do. And certificate 534g indicates that Dave has authorized Alice to do whatever Carl has authorized her to do. As shown in FIG. 5G and FIG. 6, the least fixpoint can be computed as follows. First, the trust management engine examines the certificates to identify the relevant authorizing principals—in this case, Bob, Carl, and Dave (610). Next, the state of the first authorization map (i.e., row 1 of table 502g) is initialized to "No" (612). The trust management engine then evaluates each of the certificates using the authorization information contained in row 1 of table 502g (614), and fills in row 2 of the table with the results (616). On the trust management engine's first pass through the certificates (613-618), only Bob's authorization state will change. Carl and Dave's authorization states remain unchanged, since certificates 532g and 534g both evaluate to "No" using the information contained in row 1 of table 502g (for example, certificate 532g evaluates to "No" because it only authorizes whatever Bob has authorized, and in row 1, Bob has not authorized anything). Next, row 2 is compared with row 1 (620). If they are the same (i.e., a "Yes" exit from block 620), then a fixpoint has been reached and further evaluation of the certificates is unnecessary. However, where, as here, row 1 is not the same as row 2 (i.e., a "No" exit from block 620), the certificates are evaluated again, this time using the information in the most-recently updated row—i.e., row 2 (613-620). As shown in FIG. 5G, on the trust management engine's second pass through the certificates, Carl's state is changed from N to W, and on the third pass through the certificates Dave's state is changed from N to W. If a fourth pass were conducted, the state of each of the principals would remain unchanged (i.e., Bob, Carl, and Dave would still indicate that only write access was authorized), and the certificate evaluation process would end (622).

Figure 5H:
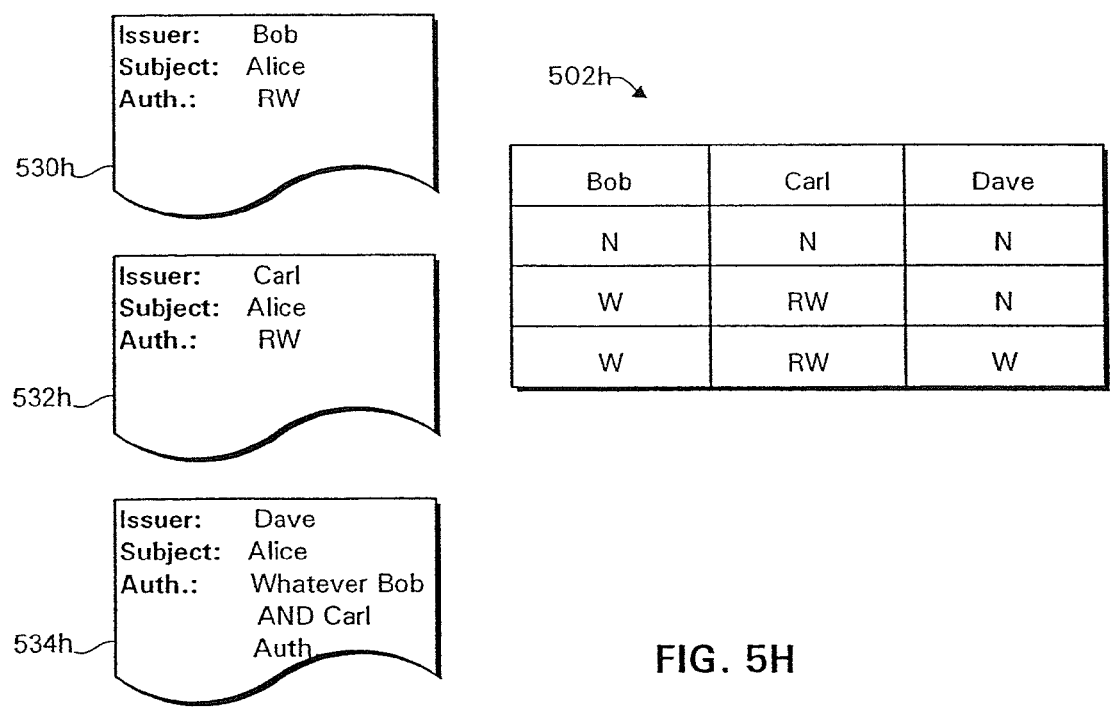

FIG. 5H illustrates the process of making a trust management decision where the certificates include a multi-way delegation. In FIG. 5H, certificate 530h indicates that Bob has authorized Alice to write, certificate 532h indicates that Carl has authorized Alice to read and write, and certificate 534h indicates that Dave has authorized Alice to do whatever both Bob and Carl have authorized her to do. As seen in FIG. 5H, the process of computing the fixpoint remains the same as previously described. On the first pass through the certificates, the table is updated to reflect the direct authorizations from Bob and Carl (see row 2 of table 502h). On the second pass through the certificates, the table is updated to show that Dave has authorized write access (that is, Dave has authorized Alice to do whatever both Bob and Carl have authorized her to do—i.e., write). A third pass would not result in any additional state changes, thus indicating that a fixpoint had been reached on the previous pass.

Figure 5I:
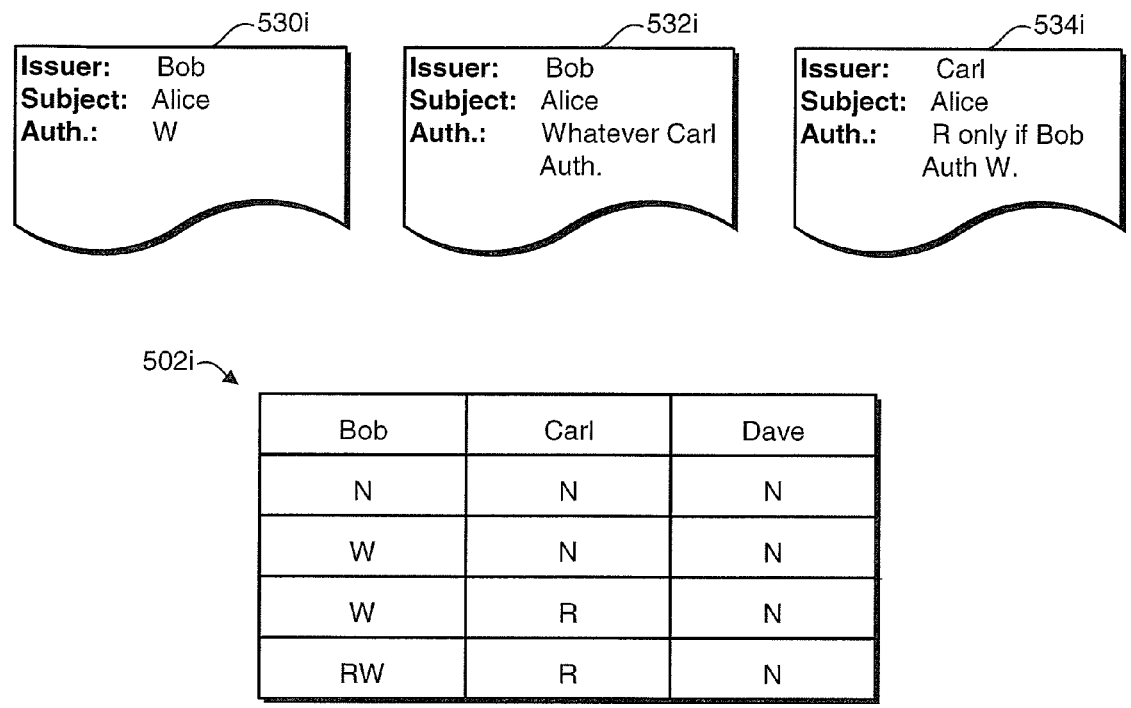

FIG. 5I illustrates the process of making a trust management decision where the certificates include an inter-assertion communication. In FIG. 5I, certificate 530i indicates that Bob has authorized Alice to write, certificate 532i indicates that Bob has also authorized Alice to do whatever Carl has authorized her to do, and certificate 534i indicates that Carl has authorized Alice to read, but only if Bob has authorized her to write. As seen in FIG. 5I, computation of the fixpoint is straightforward. On the first pass through the certificates, table 502i is updated to reflect the direct authorization from Bob that is expressed in certificate 530i (see row 2). On the next pass through the certificates, table 502i is updated to show that Carl has authorized read access (since Bob has authorized write access). Finally, on the third pass through the certificates, Bob's state is updated to show that he has granted read and write access, since certificate 532i indicates that Bob will authorize whatever Carl authorizes, and Carl has authorized read access.

FIGS. 5A-5I and 6 thus illustrate the operation of a basic trust management engine in accordance with an embodiment of the present invention. FIGS. 7-10 illustrate various optimizations and alternative embodiments.

Figure 7:
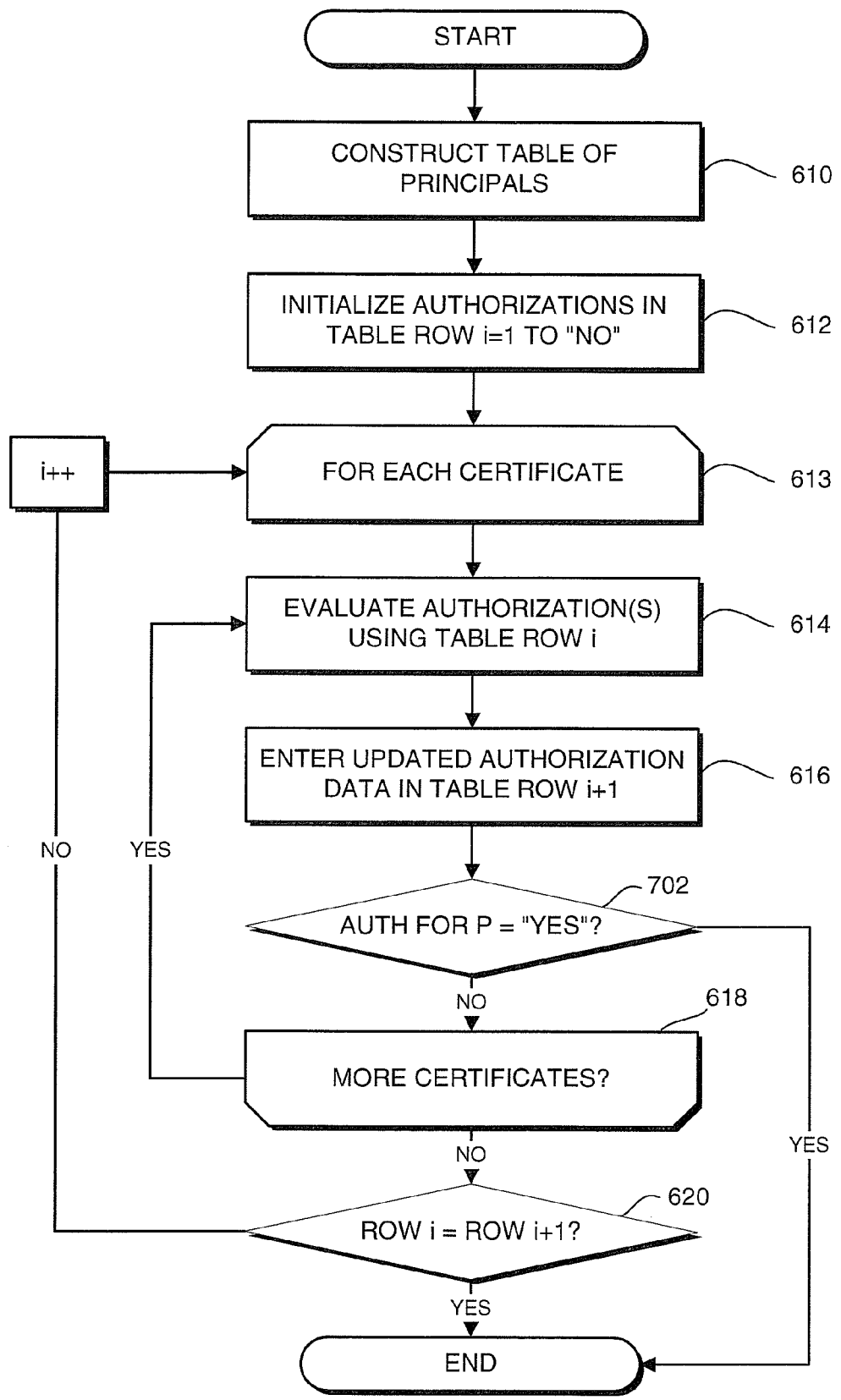
FIG. 7 illustrates another method for making trust management decision in accordance with an embodiment of the present invention.

Referring to FIG. 7, a process is shown for making trust management decisions. The process shown in FIG. 7 is closely related to the process shown in FIG. 6, but may be more efficient in certain situations. The difference between FIG. 7 and FIG. 6 is the addition of block 702 between blocks 616 and 618. Block 702 checks the authorization state of the principal from whom authorization is sought (i.e., the root principal), and terminates further processing of the certificates if authorization is detected (i.e., a "Yes" exit from block 702). If authorization is not detected, then processing continues in the manner described above in connection with FIG. 6. The optimization shown in FIG. 7 is useful when, for example, the trust management engine really only cares about the authorization of one principal. Referring to FIG. 5I, for example, if the trust management engine only needed to know whether Carl had authorized Alice to read, it could stop processing the certificates as soon as this condition was detected during the second processing pass (i.e., eliminating the remaining portion of the second processing pass, and the entire third and fourth passes). This follows from the fact that the certificates are monotonically increasing functions, and thus, once an authorization is granted, subsequent processing of the certificates will not indicate that the authorization should be denied (conversely, if the authorizations were expressed as monotone decreasing functions, once a denial of authorization was identified, further processing would not identify an authorization grant). Similarly, if the trust management engine needed to determine whether Bob had granted Alice authorization to read, further processing of the certificates could be terminated when this condition was detected during the third processing pass (i.e., eliminating the remaining portion of the third processing pass and the need to perform a fourth processing pass to confirm that a fixpoint had been reached).

Note, however, that while FIG. 7 shows block 702 appearing between blocks 616 and 618, it should be appreciated that block 702 could be placed at various other points in the process. For example, block 702 could be placed between blocks 618 and 620 (i.e., to perform an inter-processing pass check instead of an intra-pass check), or between 620 and 613. Thus one of ordinary skill in the art should appreciate that the order of the blocks shown in FIG. 7 (and in the other process flow diagrams appearing herein) can be varied without departing from the principles of the present invention.

Figure 8:
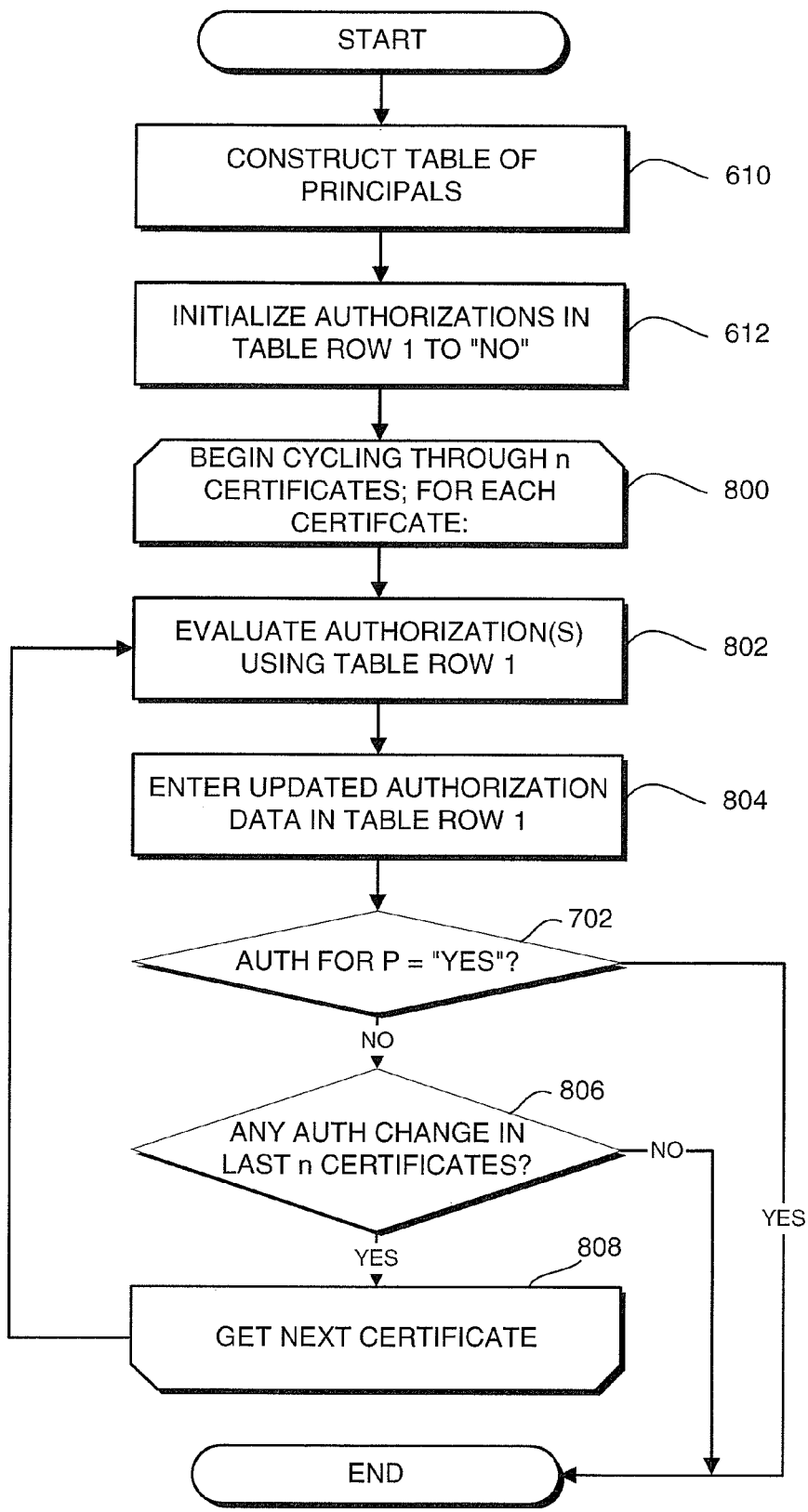
FIG. 8 illustrates another method for making trust management decision in accordance with an embodiment of the present invention.

FIG. 8 illustrates another optimization of the process shown in FIG. 6. The process shown in FIG. 8 differs from that shown in FIGS. 6 and 7 in that only one row of the authorization map is maintained, and this row is updated on-the-fly as each certificate is evaluated (blocks 802 and

804). Thus, referring to FIG. 5G for example, the fixpoint could theoretically be reached in one pass, as opposed to three, if the certificates are evaluated in the right order. In particular, if certificate 530g is evaluated first, the state of the authorization map will be changed immediately to indicate that Bob has given Alice permission to write. If certificate 532g is evaluated next, it will indicate that Carl has given Alice permission to write, and this information will also be immediately included in the authorization map. Thus, when certificate 534g is evaluated, it will conclude that Dave has given Alice permission to write. When the authorization map is updated to reflect Dave's authorization, the authorization map will be identical to row 4 of table 502g in FIG. 5G (i.e., W W W), but, in contrast to the map shown in FIG. 5G, this authorization map will have been generated by evaluating three certificates as opposed to nine (i.e., three passes through the three certificates). Of course, if the certificates were evaluated in a different order, more than three certificate evaluations may be needed. Thus, in embodiments where the certificates are processed in an arbitrary order, the procedure shown in FIG. 8 can be expected (but not guaranteed) to result in some level of processing efficiency.

As shown in FIG. 8, if at some point all of the certificates are evaluated without any change being entered into the authorization map (i.e., a "Yes" exit from block 806), then a fixpoint has been reached and further processing can be terminated. Otherwise, processing of the certificates continues until a fixpoint is reached or until some desired authorization is detected (i.e. a "Yes" exit from block 702). Thus, referring to FIG. 5G, for example, further processing of the certificates can be terminated any time all three certificates are evaluated without any change in the authorization map. In the context of FIG. 5G, this might occur if the trust management engine attempted to determine whether any principal had authorized Alice to read. Since, in FIG. 5G, Alice does not have this authorization, a "Yes" exit from block 702 will not occur, and the process will eventually terminate via a "Yes" exit from block 806.

Figure 9:
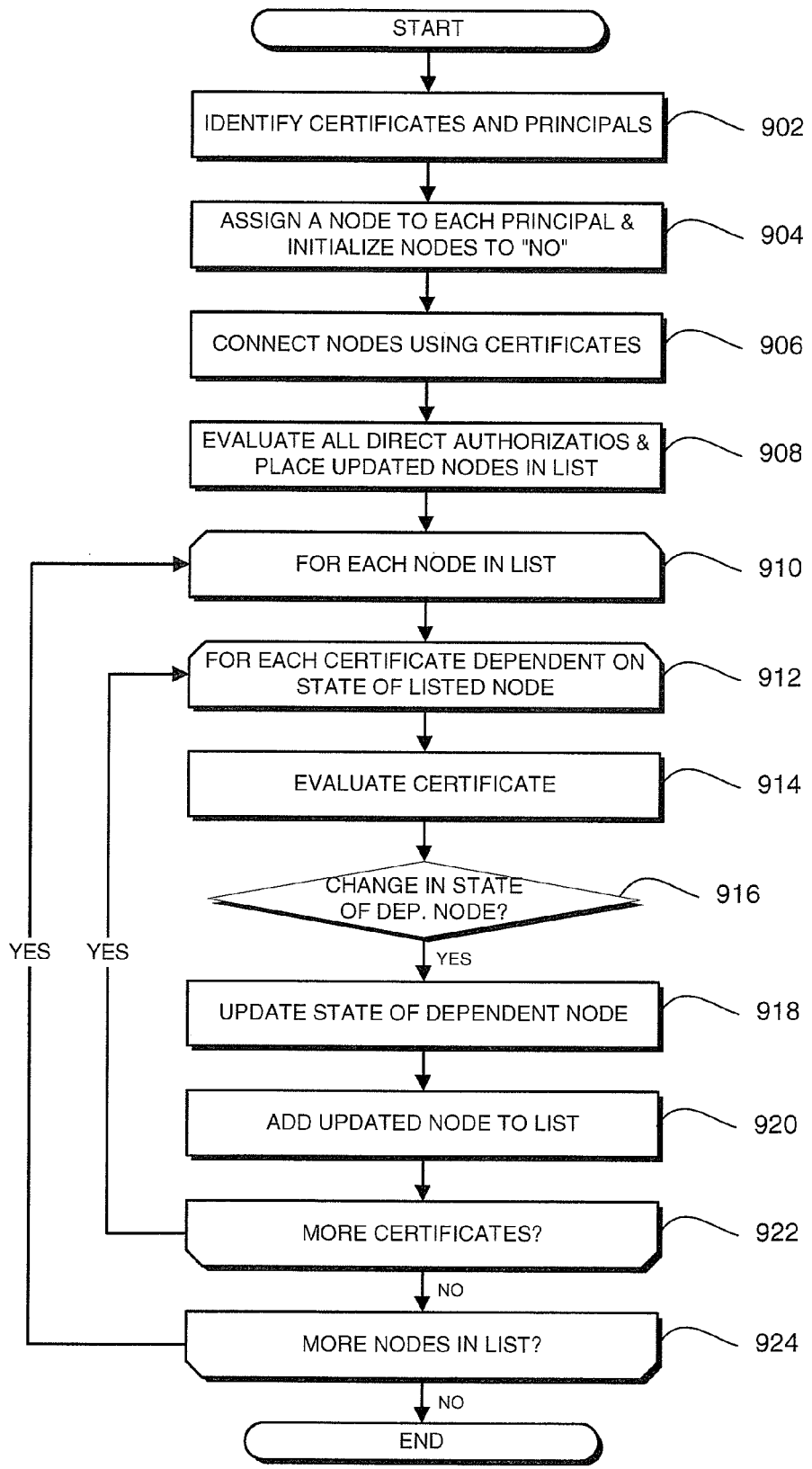
FIG. 9 illustrates another method for making trust management in accordance with an embodiment of the present invention that makes use of dependency graphs.

FIG. 9 shows yet another technique for making trust management decisions. The process shown in FIG. 9 differs from the processes shown in FIGS. 6-8 in that authorization tables like those shown in FIGS. 5A-5I are not maintained. Instead, a graph is constructed that reflects the dependencies (if any) between the various principals. The certificates are then iteratively evaluated, and the authorization states of the principals updated, until a desired authorization is detected or until a steady-state/fixed point is reached.

Referring to FIG. 9, the trust management engine first obtains a set of certificates and identifies the relevant principals (902). Next, the trust management engine forms a dependency graph by assigning a node to each principal (904), and connecting these nodes according to the relationships specified in the certificates (906).

Once the dependency graph has been generated, each of the direct authorizations in the group of certificates is evaluated (908), and if the state of any of the nodes changes as a result, that node is entered onto a list for further processing. In one embodiment, the list is implemented as a first-in, first-out queue. For each node on the list (910), each one of the certificates that depend on the state of the listed node is evaluated (912, 914), and if the state of any other node changes as a result (i.e., a "Yes" exit from block 916), that node's state is updated (918) and the node is added to the list (920). A fixpoint is reached when there are no more nodes on the list. Alternatively, processing could be terminated before the fixpoint was reached if a desired level of authorization was detected (e.g., if a predefined node's authorization increased to a certain level).

Figure 10:
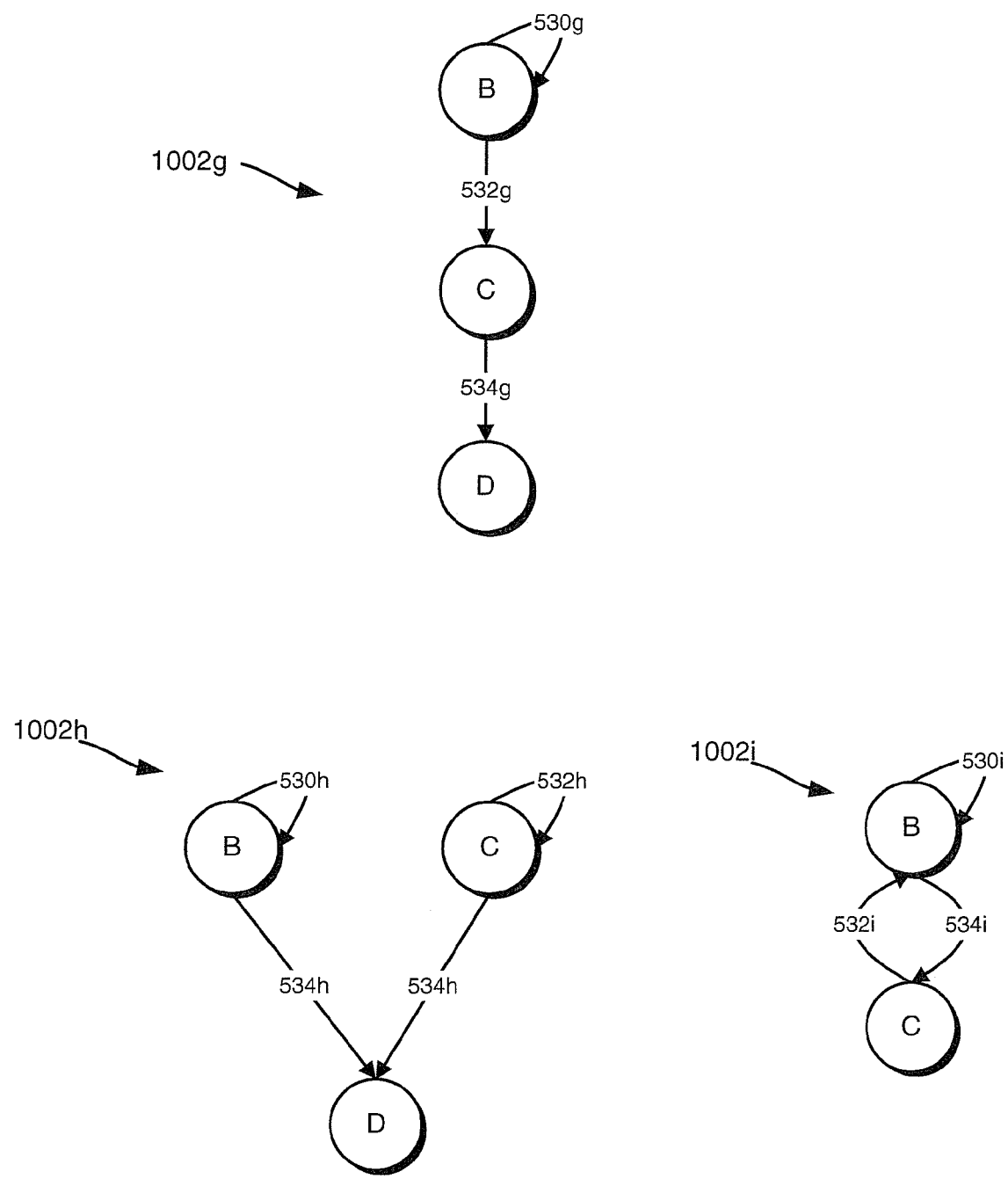
FIG. 10 illustrates a set of dependency graphs for use in making trust management decisions.

FIG. 10 shows several illustrative dependency graphs corresponding to the sets of certificates discussed above in connection with FIGS. 5G, 5H, and 5I. Referring to FIG. 10, graph 1002g includes three nodes—B, C, and D—corresponding to the three principals discussed in connection with FIG. 5G (i.e., Bob, Carl, and Dave, respectively). Node B issues one certificate, represented by arrow 530g. As shown in FIG. 5G, this certificate indicates that Bob authorizes Alice to write. Since this certificate is not dependent on the state of any of the other nodes, arrow 530g does not connect to any other node. As shown in FIG. 5G, Carl (represented in FIG. 10 by node C) issues a certificate indicating that Alice may do whatever Bob says she may do. Since evaluation of this certificate depends on the state of node B (i.e., Bob), an arrow 532g is drawn from node B to node C. If Bob's state changes, then certificate 532g will be evaluated, and Carl's state updated if necessary. Similarly, an arrow 534g is drawn between node C and node D to represent the dependence between Carl's state and Dave's state via certificate 534g.

Graph 1002h shows the dependency graph for the set of certificates 530h, 532h, 534h shown in FIG. 5H. As shown in FIG. 5H and FIG. 10, certificates 530h and 532h are direct authorizations, and thus do not connect to other nodes. Certificate 534h, on the other hand, expresses a dependency between Dave's state (node D), and the states of Bob and Carl (nodes B and C). When the process shown in FIG. 9 is carried out, nodes B and C will initially be added to the node list (908), since evaluation of certificates 530h and 532h will change their respective states. When processing of the list reaches either of these nodes (910), certificate 534h will be evaluated (914), and the state of node C updated (916, 918). Although FIG. 9 would imply that node C should be added to the list, since no other nodes are dependent on the state of node C, this would be unnecessary. Thus, in some embodiments the trust management engine might decline to add nodes to the list that do not have other nodes that depend directly or indirectly on their state.

Similarly, Graph 1002i shows the dependency graph for the set of certificates 530i, 532i, 534i shown in FIG. 5I. As shown in FIG. 5I and FIG. 10, certificate 530i is a direct authorization, while certificates 532i and 534i express the dependency of Bob's state on Carl's state and vice-versa. When the process shown in FIG. 9 is carried out, direct authorization 530i will be evaluated and node B will be added to the node list (908). When node B is processed (910, 912), certificate 534i will be evaluated (914), the state of node C will be updated (916, 918), and node C will be added to the list (920). Similarly, when node C is processed, certificate 532i will be evaluated, the state of node B will be updated, and node B will be added to the list. When node B is processed again, the state of node C will not change when certificate 534i is evaluated, and the fixpoint computation process will terminate (i.e., a "No" exit from block 924).

One of ordinary skill in the art will appreciate that the processes and structures illustrated in FIGS. 5A-10 can be implemented in any of a variety of ways, including via well-known programming techniques and standard programming languages such as C, C++, Java, Lisp, Perl, ML, or the like. For example, the dependency graphs of FIGS. 9 and 10 could be implemented using an adjacency list representation of the graph, and a worklist algorithm could be used to compute the fixpoint. Worklist algorithms are well-known in the art, and examples can be found in, e.g., Muchnick, *Advanced Compiler Design and Implementation*, pages 232-233 (Morgan Kaufman 1997), which is hereby incorporated by reference. In one embodiment, each node in the dependency graph is assigned its own adjacency list. Entries in the adjacency list correspond to entries/nodes in the graph, and may specify the various successor nodes and the certificates/functions corresponding thereto.

It will be appreciated that other modifications could be made to the processes shown in FIGS. 6-9 without departing from the principles of the present invention. For example, in the process shown in FIG. 6-9, certificates that express direct authorization (such as certificate 530g in FIG. 5G) need not be evaluated more than once, since further evaluation will not have an effect on the authorization map/graph.

The Simple Public Key Infrastructure (SPKI) is a well-known framework for expressing authorizations. SPKI certificates can contain two types of assertions—name assertions and authorization assertions. The SPKI authorization lattice can be viewed as a powerset lattice with two kinds of authorizations, name and action. The meaning of a name is taken relative to a given principal. A full name is a principal and a sequence of names. A name assertion is represented by a 4-tuple $<p,n,s,<t_1,t_2>>$, which means that principal, p, authorizes subject s to act on behalf of name n at any time between $t_1$ and $t_2$. The subject field can either directly identify a full name, or specify a threshold subject of the form, $<k,\{f_1, f_2, \ldots\}>$. A principal can only act for a threshold subject if at least k of the names $f_1, f_2, \ldots$ denote that principal.

An authorization assertion is represented by a 5-tuple $<p,s,d,x,<t_1,t_2>>$ which means that principal p authorizes subject s to perform (and delegate, if d is true) the operations allowed by action x at any time between $t_1$ and $t_2$. In general terms, actions denote sets of s-expressions, and can comprise virtually any operation one might want to control with a trust management system.

The process of making an SPKI trust management computation will now be described. Suppose it is desired to know if principal p authorizes principal p' to perform a certain operation at time t using the assertions A. To make this determination, a trust management engine evaluates the certificates for a least fixpoint, or for an approximation of the least fixpoint that is sufficient to show that p' is authorized to perform the operation. Examples of such a computation are provided below in FIGS. 12 and 13, and additional information regarding the process of making SPKI trust management decisions in accordance with the present invention can be found in Appendix A.

Note that, in general, name assertions affect the meaning of authorization assertions, but not vice-versa. Thus, instead of computing a least fixpoint over the entire SPKI authorization map lattice for a given trust management decision, it is possible to first compute a fixpoint over the principal-name lattice (i.e., to resolve the name assertions), and then compute a fixpoint over the principal-authorization lattice. The first fixpoint computes for each principal, p, the pairs $<p', n>$ such that p authorizes p' to act on behalf of name n at time t The second fixpoint computes for each principal p whether or not the request u is authorized by p. If there are c assertions, the first fixpoint will generally require O(c) space and the second only O(c) space. In practice, the time for trust management computation will often be small in comparison to the cryptographic costs of signature checking. Appendix A—and section 3 and FIGS. A-3 and A-4 in particular—provides more information on how to express SPKI in the framework presented herein.

Figure 11:
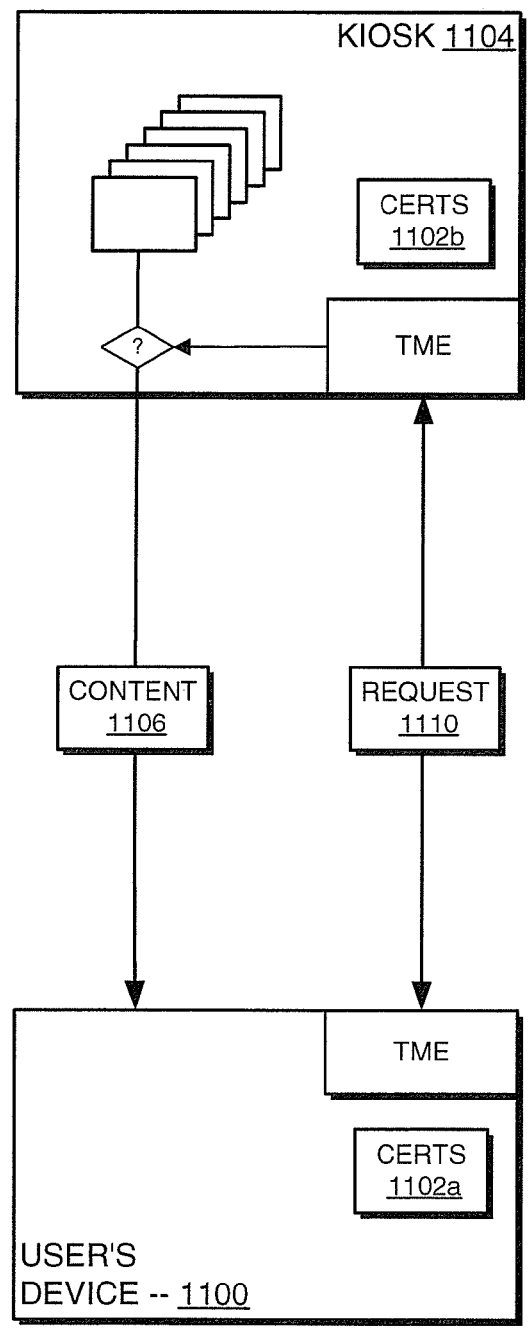
FIG. 11 illustrates a system for practicing embodiments of the present invention.

FIG. 11 provides another example of a process that can be governed using a trust management engine operating in accordance with an embodiment of the present invention. FIG. 11 illustrates a scenario in which a user attempts to move a piece of protected content from one device to another. For example, the user may attempt to download a digitally-encoded song 1106 from a kiosk 1104 to an electronic music player 1100, or may attempt to download a digitally-encoded movie from an Internet website. As shown in FIG. 11, the user (and/or the kiosk) may have one or more SPKI certificates 1102 issued by other entities in the system. For example, the user or kiosk may have a certificate from the music producer, one or more distributors, a rights management provider, and/or the like. These certificates may have been obtained through any of a variety of means. For example, the user may have downloaded some of these certificates in connection with purchasing the content, others in connection with purchasing the application that renders the content, and others when installing the rights management software/hardware that controls the use of the content.

As shown in FIG. 11, a user indicates that he or she wishes to move content item 1106 from device 1104 to device 1100. The trust management system 1108 on kiosk 1104 receives this request 1110 (and possibly additional certificates 1102) and determines whether the user has authorization to perform the requested action. To make this determination, the trust management engine 1108 uses SPKI certificates 1102. As previously described, the trust management engine takes the certificates and determines whether they indicate that the user has authorization to perform the requested action. For example, to download a song to a portable device from an in-store kiosk, the user may need the authorization of the content owner, the store, and/or the kiosk provider. While the kiosk may be able to grant its authorization to the user directly, the content owner's authorization may, for example, be deducible only by tracing back through the authorizations obtained from various other entities in the song's distribution chain.

Moreover, by presenting the appropriate certificates, it may be possible for the portable device to establish authorization to download the content even though no direct authorization was obtained from the kiosk (e.g., if the user had previously purchased the content from an affiliate distributor, and the kiosk was authorized to download content if authorized by the affiliate). Here, the kiosk's trust management system might still wish to verify that the user has authorization to download the content, but will need to examine the chain of certificates presented by the user and/or stored in, or obtained by, the kiosk. Alternatively, or in addition, the device (or a trust management engine thereon) might wish to verify the kiosk's authorization to store and supply content.

If a trust management engine determines that the user and/or the kiosk does not have proper authorization, then the download is prevented (or, if the download has already occurred, a rights management engine on the user's system may simply deny access to the content); otherwise, the action is performed in accordance with the user's request. In some embodiments the authorization process may not be a simple yes/no decision, and different consequences might flow from the level of authorization that was detected. In addition, the response to a "no" determination may not be to prevent the action, but may instead be to take some other action, such as sending a notification to some entity responsible for monitoring such occurrences.

FIGS. 12-13 illustrate the operation of a trust management engine that processes SPKI certificates and renders trust management decisions. Specifically, FIGS. 12 and 13 show a set of SPKI assertions from which a trust management engine will attempt to determine whether a content owner has authorized a particular device to download a particular content item. Table 1202 contains a set of SPKI name assertions, and table 1302 contains a set of SPKI authorization assertions. Tables 1204 and 1304 illustrate how to use these certificates to make efficient trust management decisions.

Referring to FIGS. 12 and 13, given a request by Device No. 123 to download protected content from a Retail Store, a trust management engine processes the certificates shown in FIGS. 12 and 13 to determine if the request should be granted. For example, the trust management engine might frame the question as: Is Device No. 123 authorized by Music Co. to download the requested content? To arrive at this question, the trust management engine may, for example, have consulted a database indicating that authorization from Music Co. is required before the particular content item can be downloaded. This could be determined by, e.g., examining the terms of the distribution agreement between Music Co. and the Retail Store, or an electronic representation thereof maintained by the trust management system.

Since the authorization certificates shown in table 1302 do not show Device No. 123 as a principal, the trust management engine might first determine whether Device No. 123 is a Supported Device. If the answer is "yes", then the trust management engine could determine whether Device No. 123, as a Supported Device, is authorized by Music Co. to download the requested content. Alternatively, the order of these two decisions could be switched. That is, the trust management system might first determine if a Supported Device is authorized by Music Co. to download the requested content, and then determine whether Device No. 123 is a Supported Device. In other embodiments, these determinations can be made concurrently or substantially concurrently.

FIG. 12 shows a set of SPKI name assertions that can be used to complete the processing of the request described above. For clarity, the SPKI certificate validity period is not shown. To determine whether Device No. 123 is a Supported Device, the trust management engine processes the certificates shown in table 1202. Table 1204 illustrates a technique for making this determination. In particular, Table 1204 shows a least fixpoint solution to the question: What set of principals does each issuer's name denote? As seen in row 4 of table 1204, Device No. 123 is a Retail Store Supported Device. Having determined that Device No. 123 is a Supported Device, the trust management system now attempts to determine whether Device No. 123, as a Supported Device, has authorization from Music Co. to download the requested content.

Referring to FIG. 13, table 1302 shows a set of SPKI authorization assertions. For ease of explanation, the SPKI certificate validity period has been omitted. Table 1304 illustrates a technique for using the certificates contained in table 1302 to answer the question: Has Music Co. authorized Device No. 123 to download the requested content? As seen in row 4 of table 1304, Music Co. has authorized Device No. 123 to download the requested content item. Note that in evaluating the Retail Store's certificate, the result of the first fixpoint tells us that Device No. 123 is a Supported Device.

Thus, it should be appreciated that the systems and methods of the present invention can be used to implement trust management engines for a wide variety of trust management systems. For example without limitation the framework of the present invention can be applied to trust management systems such as Keynote (as discussed in Appendix A) in addition to SPKI and the trust management system discussed in connection with FIGS. 5A-5I.

As described above, the problem of access control can be broken into two sub-problems: determining whether or not a request should be allowed, and enforcing the decision. The first sub-problem can be solved by a trust management system that uses the techniques described above to determine when requests are authorized. The second sub-problem—enforcing the decision—can be solved by applying a suitable combination of security techniques and principles, such as encryption, tamper resistance, physical protection, security-by-obscurity, or the like. Several security considerations are discussed below; it should be appreciated, however, that for purposes of practicing some embodiments of the present invention, any suitable security techniques can be used. In some embodiments, no special security measures are taken beyond that which is inherent in the trust management decision process.

The effectiveness of the trust management system will generally depend, at least in part, on the integrity and authenticity of the certificates that are used to make the trust management decisions. If these certificates have been improperly modified, and/or have been forged, the trust management system may make decisions that are contrary to the intentions of the authorizing principals. A wide variety of cryptographic and other techniques exist which can be used to protect the integrity and authenticity of the certificates, and/or to revoke certificates. For example, the present invention can be used in connection with the security mechanisms described in Menezes at pages 425-586 and 645-662, or in commonly-assigned U.S. Pat. No. 6,157,721, issued Dec. 5, 2000, entitled "Systems and Methods Using Cryptography to Protect Secure Computing Environments," and U.S. patent application Ser. No. 09/628,692, entitled "Systems and Methods for Using Cryptography to Protect Secure and Insecure Computing Environments," each of which is hereby incorporated by reference. Alternatively, or in addition, security can be achieved through physical means, such as, for example, isolating the computer systems on which the trust management engine runs. For example, the trust management engine might be implemented on an enterprise server that is password-protected and locked in a secure room. The certificates needed to make trust management decisions might be generated by processes running on the server, or by systems or processes that are in secure communication therewith.

In some embodiments the trust management engine operates in connection with, and/or forms part of, a larger rights management or enforcement engine that is responsible for controlling and/or monitoring access to electronic content and other resources in accordance with certain rules and policies. Additional information on rights management systems can be found in commonly-assigned U.S. Pat. No. 5,892,900, entitled "Systems and Methods for Secure Transaction Management and Electronic Rights Protection", issued Apr. 6, 1999 ("the '900 patent"), which is hereby incorporated by reference in its entirety. For purposes of practicing the present invention, any suitable rights management engine could be used, including without limitation embodiments of the Rights Operating System software described in the '900 patent, the InterRights Point™ software or Rights/System™ software developed by InterTrust Technologies Corporation of Santa Clara, Calif., or any of the other commercially-available digital rights management technologies. In other embodiments, the trust management engine does not form part of a larger digital rights management product or process.

In a preferred embodiment, the trust management engine is protected from tampering and/or other improper access. This can be accomplished using a combination of tamper resistance techniques and cryptographic protections, such as those described in the '900 patent or in commonly-assigned U.S. patent application Ser. No. 09/095,346, entitled "Obfuscation Techniques for Enhancing Software Security," filed Jun. 9, 1998 ("the '346 application"), which is hereby incorporated by reference in its entirety. If the trust management engine forms part of a larger rights management engine, the mechanisms used to protect the rights management engine will typically serve to protect the trust management engine as well. Alternatively, or in addition, aspects of the trust management engine can be implemented in (and/or designed to take advantage of) hardware security mechanisms such as secure processing units, protected memory, and the like.

Figure 14:
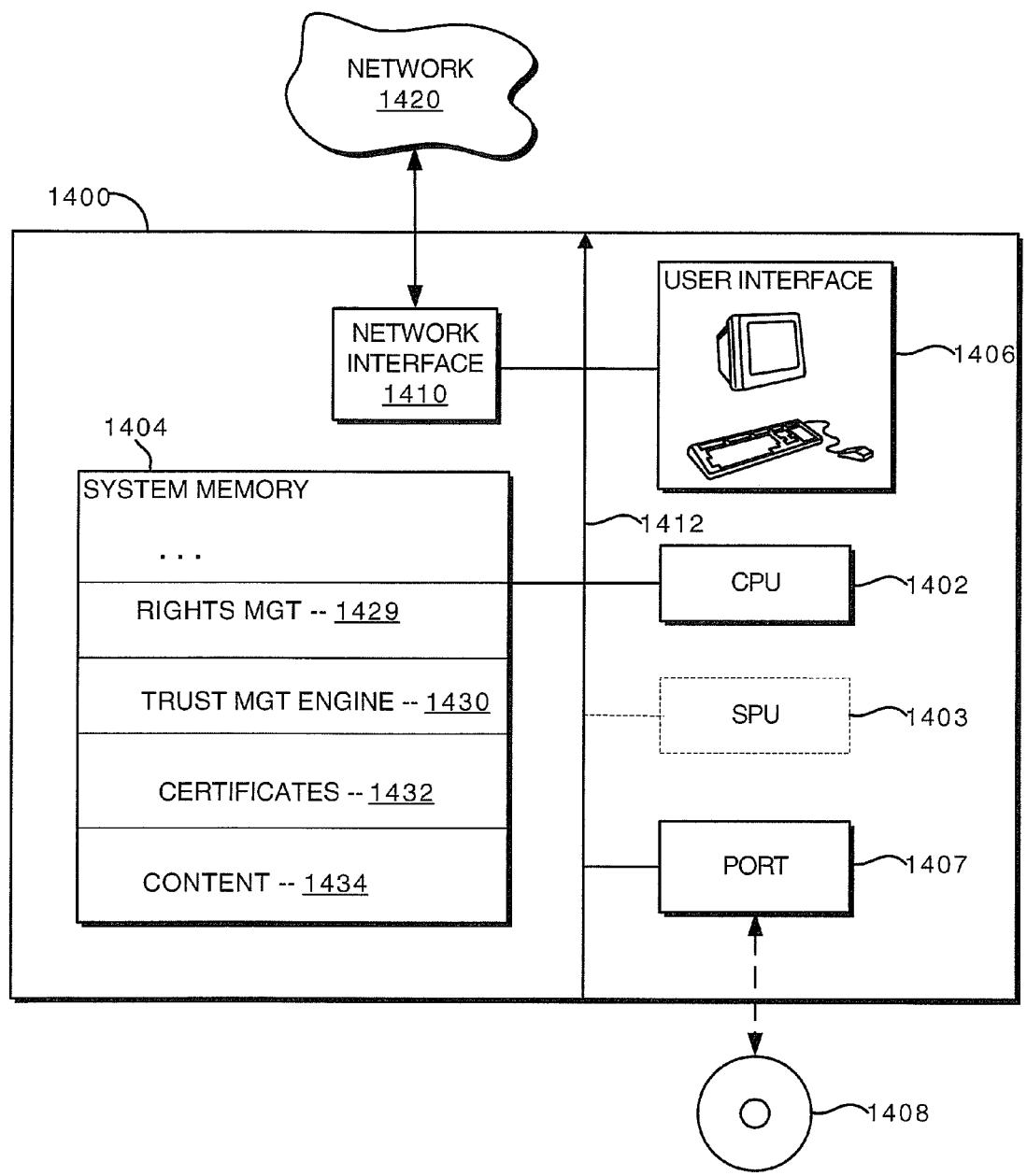
FIG. 14 illustrates a computer system that can be used to practice embodiments of the present invention.

FIG. 14 shows an example of a computer system 1400 that can be used to practice embodiments of the present invention. Computer system 1400 may comprise a general-purpose computing device such as a personal computer or network server, or a specialized computing device such as a cellular telephone, personal digital assistant, portable audio or video player, television set-top box, kiosk, or the like. Computing device 1400 will typically include a processor 1402, memory 1404, a user interface 1406, a port 1407 for accepting removable memory 1408, a network interface 1410, and a bus 1412 for connecting the aforementioned elements. The operation of computing device 1400 will typically be controlled by processor 1402 operating under the guidance of programs stored in memory 1404. Memory 1404 will generally include both high-speed random-access memory (RAM) and non-volatile memory such as a magnetic disk and/or flash EEPROM. Some portions of memory 1404 may be restricted, such that they cannot be read from or written to by other components of the computing device 1400. Port 1407 may comprise a disk drive or memory slot for accepting computer-readable media such as floppy diskettes, CD-ROMs, DVDs, memory cards, other magnetic or optical media, or the like. Network interface 1410 is typically operable to provide a connection between computing device 1400 and other computing devices (and/or networks of computing devices) via a network 1420 such as the Internet or an intranet (e.g., a LAN, WAN, VPN, etc.). In one embodiment, computing device 1400 includes a secure processing unit 1403 such as that described in the '900 patent. A secure processing unit can help enhance the security of sensitive operations such as key management, signature verification, and other aspects of the trust management decision and enforcement process.

As shown in FIG. 14, memory 1404 of computing device 1400 may include a variety of programs or modules for controlling the operation of computing device 1400. For example, memory 1404 preferably includes a program 1430 for implementing some or all of the functionality of the trust management engine described above. In some embodiments, the trust management engine may also be capable of applying policies, rules, and/or controls to govern the use of content or the performance of events, and/or these policies, rules, and/or controls may be applied by a rights management program 1429, such as that described in the '900 patent. Memory 1404 may also include a program—such as that described in U.S. patent application Ser. No. 09/617,148, entitled "Trusted Storage Systems and Methods", filed Jul. 17, 2000, which is hereby incorporated by reference—for maintaining a database of protected data such as cryptographic keys, certificates, or the like. In addition, memory 1404 may contain protected content 1434.

One of ordinary skill in the art will appreciate that the systems and methods of the present invention can be practiced with computing devices similar or identical to that illustrated in FIG. 14, or with virtually any other suitable computing device, including computing devices that do not possess some of the components shown in FIG. 14 and/or computing devices that possess other components that are not shown.

Thus it should be appreciated that FIG. 14 is provided for purposes of illustration and not limitation as to the scope of the invention.

APPENDIX A

Mathematical Background & Additional Embodiments

The following discussion provides a mathematical framework for certain embodiments of the present invention. It should be appreciated, however, that some embodiments of the present invention may be practiced without conforming to all of the mathematical "requirements" and optimizations set forth below.

Although the foregoing invention has been described in some detail for purposes of clarity, it will be apparent that certain changes and modifications may be practiced within the scope of the appended claims. It should be noted that there are many alternative ways of implementing both the processes and apparatuses of the present invention. Accordingly, the present embodiments are to be considered as illustrative and not restrictive, and the invention is not to be limited to the details given herein, but may be modified within the scope and equivalents of the appended claims.

What is claimed is:

1. In a computer-implemented trust management system, a method for controlling access to a computing resource, the method including: obtaining a request for the computing resource; obtaining a group of certificates, each certificate expressing at least one authorization by at least one principal; identifying a set of principals associated with the certificates; initializing a state associated with each principal; evaluating a certificate as a function of the state associated with one or more of the principals; updating the state of one or more of the principals if the result of said evaluating step indicates that the state of a principal should be changed; and repeating said evaluating and updating steps until a fixpoint is reached or until a predefined principal is found to authorize the request.

2. A method as in claim 1, further including:

constructing a dependency graph, the dependency graph containing a node corresponding to each principal in the set of principals; and connecting at least two nodes in the dependency graph with a certificate that expresses a dependency of one node on the state of another node;

wherein the dependency graph is used, at least in part, during said evaluating, updating, and repeating steps to determine which certificates to evaluate.

3. A method as in claim 1, in which said updating step is performed after each of the certificates has been evaluated.

4. A method as in claim 1, in which the request for the computing resource is obtained from a first principal, and in which at least one of the certificates is obtained from the first principal, the certificate having been issued by a second principal.

5. A method as in claim 1, in which the certificates comprise Simple Public Key Infrastructure certificates.

6. A method as in claim 1, in which the computing resource is one of: access to a piece of electronic content; use of a computer program; ability to execute a transaction; access to a computer; and access to a network.

7. A non-transitory computer-readable medium containing computer-executable program instructions that, when executed by a computer system, cause the computer system to perform a method comprising:
- obtaining a request to perform a predefined action;
- obtaining a group of authorizations for the predefined action, one or more of the authorizations in the group being a function of the authorization state of one or more principals;
- identifying a set of principals associated with the authorizations and for initializing a state associated with each principal;
- evaluating authorizations from the set of authorizations using the state associated with each principal;
- updating the state of the principals;
- repeating said evaluating and updating steps until a fixpoint is reached or until a predefined principal is deemed to authorize the request.

8. The non-transitory computer-readable medium of claim 7, wherein the computer-readable medium is one of a: CD-ROM, DVD, MINIDISC, floppy disk, magnetic tape, flash memory, ROM, RAM, system memory, hard drive, and optical storage.

* * * * *